United States Patent
Shoshan et al.

(10) Patent No.: US 10,615,864 B2
(45) Date of Patent: Apr. 7, 2020

(54) PARTIAL DOWNLINK REPEATER APPARATUS AND METHODS USEFUL IN CONJUNCTION THEREWITH

(71) Applicant: Elta Systems Ltd., Ashdod (IL)

(72) Inventors: Yaakov Shoshan, Ashkelon (IL); Gil Koifman, Petach-Tikva (IL)

(73) Assignee: ELTA SYSTEMS LTD., Ashdod (IL)

( * ) Notice: Subject to any disclaimer, the term of this patent is extended or adjusted under 35 U.S.C. 154(b) by 0 days.

(21) Appl. No.: 16/188,323

(22) Filed: Nov. 13, 2018

(65) Prior Publication Data

US 2019/0081695 A1 Mar. 14, 2019

Related U.S. Application Data

(63) Continuation of application No. 14/439,803, filed as application No. PCT/IL2013/050875 on Oct. 27, 2013, now Pat. No. 10,128,935.

(30) Foreign Application Priority Data

Nov. 1, 2012 (IL) .......................................... 222786

(51) Int. Cl.
*H04L 12/801* (2013.01)
*H04L 12/24* (2006.01)
(Continued)

(52) U.S. Cl.
CPC ....... *H04B 7/15507* (2013.01); *H04B 7/0617* (2013.01); *H04B 7/15528* (2013.01); *H04B 7/15542* (2013.01); *H04W 84/047* (2013.01)

(58) Field of Classification Search
CPC ............ H04B 7/15507; H04B 7/15542; H04B 7/0617
See application file for complete search history.

(56) References Cited

U.S. PATENT DOCUMENTS 2,292,386 A    8/1942  Manson
4,475,243 A   10/1984  Batlivala et al.
(Continued)

FOREIGN PATENT DOCUMENTS

WO    2007123733 A2    11/2007
WO    2010132476 A2    11/2010
(Continued)

OTHER PUBLICATIONS

Torvmark, "Frequency Hopping System," Chipcon Products from Texas Instruments Application Note AN014, Retrieved from the Internet: <<http://www.ti.com/lit/an/swra077/swra077.pdf>> Dec. 31, 2002, Sections: 'protocol,' p. 4, 'CC400/CC9001,' p. 5.
(Continued)

*Primary Examiner* — Brian S Roberts
*Assistant Examiner* — Abusayeed M Haque
(74) *Attorney, Agent, or Firm* — Oliff PLC

(57) ABSTRACT

For use with a cellular communication network having a base station transmitting downlink signals received by mobile device/s: a downlink signal reception enhancement system including partial repeater apparatus enhancing quality of reception of at least a portion of downlink signal/s by mobile device/s, the partial repeater apparatus including a downlink receiver receiving at least a portion of downlink signal/s arriving from the base station; a controller including a critical region selector, selecting only a portion of at least one individual downlink signal; and a partial transmitter generating signal/s by regenerating, according to characteristic/s of at least one of a downlink signal and the mobile device, at least the portion selected by the critical region selector, and to transmit a signal including at least the regenerated portion plus less than all of the individual downlink signal.

19 Claims, 22 Drawing Sheets

(51) Int. Cl.
*H04L 5/14* (2006.01)
*H04L 12/28* (2006.01)
*H04B 7/155* (2006.01)
*H04B 7/06* (2006.01)
*H04W 84/04* (2009.01)

(56) References Cited

U.S. PATENT DOCUMENTS

| | | | |
|---|---|---|---|
| 4,752,939 A | 6/1988 | Amoroso et al. | |
| 4,849,963 A | 7/1989 | Kawano et al. | |
| 4,941,200 A | 7/1990 | Leslie et al. | |
| 5,774,450 A | 6/1998 | Harada et al. | |
| 6,023,491 A | 2/2000 | Saka et al. | |
| 6,980,509 B1 | 12/2005 | Okada et al. | |
| 7,003,291 B2 | 2/2006 | Zhnag | |
| 7,231,197 B1 | 6/2007 | Fisher | |
| 7,522,877 B1 | 4/2009 | Avellan et al. | |
| 7,711,029 B2 | 5/2010 | Guey | |
| 8,942,721 B1 | 1/2015 | Aragon | |
| 2002/0003773 A1 | 1/2002 | Okada et al. | |
| 2002/0034214 A1 | 3/2002 | Okada et al. | |
| 2003/0214919 A1 | 11/2003 | Kilfoyle et al. | |
| 2004/0095902 A1 | 5/2004 | Laroia et al. | |
| 2004/0264548 A1 | 12/2004 | Miyoshi | |
| 2005/0109917 A1 | 5/2005 | Wong | |
| 2005/0181799 A1 | 8/2005 | Laroia et al. | |
| 2005/0191654 A1* | 9/2005 | Drandi | C12Q 1/6886 435/6.12 |
| 2006/0002288 A1 | 1/2006 | Okada et al. | |
| 2006/0084441 A1* | 4/2006 | Dowling | H04W 24/04 455/445 |
| 2006/0198292 A1 | 9/2006 | Yoshii et al. | |
| 2006/0222054 A1 | 10/2006 | Conyers et al. | |
| 2006/0223468 A1 | 10/2006 | Toms et al. | |
| 2006/0233276 A1 | 10/2006 | Green | |
| 2007/0177691 A1 | 8/2007 | Ruprich | |
| 2007/0254592 A1 | 11/2007 | McCallister et al. | |
| 2007/0259636 A1 | 11/2007 | Fisher | |
| 2008/0003948 A1* | 1/2008 | Mitran | H04B 7/024 455/67.11 |
| 2008/0287081 A1 | 11/2008 | Van Dam et al. | |
| 2009/0017814 A1* | 1/2009 | Horiuchi | H04B 7/15557 455/422.1 |
| 2009/0100165 A1* | 4/2009 | Wesley, Sr. | G06F 15/173 709/223 |
| 2009/0109919 A1 | 4/2009 | Bertrand et al. | |
| 2009/0203385 A1* | 8/2009 | Khandekar | H04W 16/10 455/452.1 |
| 2009/0232071 A1 | 9/2009 | Cho et al. | |
| 2010/0048155 A1 | 2/2010 | Wang | |
| 2010/0074349 A1 | 3/2010 | Hyllander et al. | |
| 2010/0120397 A1 | 5/2010 | Kazmi et al. | |
| 2010/0150027 A1* | 6/2010 | Atwal | H04W 16/18 370/254 |
| 2010/0167768 A1* | 7/2010 | Tsutsui | H04B 7/15542 455/500 |
| 2010/0304665 A1* | 12/2010 | Higuchi | H04B 7/15535 455/7 |
| 2010/0322334 A1 | 12/2010 | Wang et al. | |
| 2011/0081856 A1 | 4/2011 | Johansson et al. | |
| 2011/0150043 A1 | 6/2011 | Bergervoet et al. | |
| 2011/0207495 A1 | 8/2011 | Gerstenberger et al. | |
| 2011/0235647 A1 | 9/2011 | Baba et al. | |
| 2011/0235743 A1 | 9/2011 | Lee et al. | |
| 2011/0268331 A1* | 11/2011 | Binning | G06F 19/321 382/131 |
| 2011/0286397 A1 | 11/2011 | Kim et al. | |
| 2011/0287802 A1* | 11/2011 | Ma | H04L 5/0066 455/517 |
| 2012/0135779 A1* | 5/2012 | Kundargi | H04W 52/343 455/522 |
| 2012/0163333 A1 | 6/2012 | Arnott et al. | |
| 2012/0188919 A1 | 7/2012 | Subasic et al. | |
| 2012/0203512 A1* | 8/2012 | Shahpar | G06T 17/20 703/1 |
| 2012/0309299 A1 | 12/2012 | Kimura et al. | |
| 2013/0005239 A1 | 1/2013 | Almgren et al. | |
| 2013/0064314 A1 | 3/2013 | Ko et al. | |
| 2013/0094490 A1 | 4/2013 | Taromaru et al. | |
| 2013/0229939 A1 | 9/2013 | Teyeb et al. | |
| 2013/0287152 A1 | 10/2013 | Wu et al. | |
| 2013/0315320 A1 | 11/2013 | McGowan et al. | |
| 2014/0092816 A1 | 4/2014 | Ito | |
| 2016/0112114 A1 | 4/2016 | Shoshan et al. | |

FOREIGN PATENT DOCUMENTS

| | | |
|---|---|---|
| WO | 2011123696 A1 | 10/2011 |
| WO | 2012036787 A2 | 3/2012 |
| WO | 2012124917 A2 | 9/2012 |

OTHER PUBLICATIONS

Encyclopedia definition of selector, http://www.encyclopedia.com/humanities/dictionaries-thesauruses-pictures-and-press-releases/selector-0, retrieved on Sep. 10, 2017.
Cambridge Dictionary definition of selector<http://dictionary.cambridge.org/dictionary/english/selector, retrieved on Sep. 10, 2017.
Electronic Tutorials, "The Multiplexer (MUX) and Multiplexing Tutorial". 3. Multiplexer (MUX) and Multiplexing Tutorial—Electronics Tutorials, http://www.electronics-tutorials.ws/combination/comb_2.html, Aspencore, retrieved on Oct. 1, 2017.
Electronic Tutorials, "Basic Electronics Tutorials and Revision". http://www.electronics-tutorials.ws/, Aspencore, retrieved on Sep. 10, 2017.
Statement-Level Conttrol Structure, "Chapter 7". http://groups.engin.umd.umich.edu/CIS/course.des/cis400/maxim/lectures/chp7.htm, retrieved on Sep. 10, 2017.
Wikipedia, "Conditional (Computer Programming)", pp. 1-10, https://en.wikipedia.org/wiki/Conditional_(computer_programming), retrieved on Sep. 10, 2017.

* cited by examiner

PARTIAL DOWNLINK REPEATER APPARATUS AND METHODS USEFUL IN CONJUNCTION THEREWITH

REFERENCE TO CO-PENDING APPLICATIONS

This application is a continuation of U.S. application Ser. No. 14/439,803 filed on Apr. 30, 2015, which is a National Phase application of International Application No. PCT/IL2013/050875 filed Oct. 27, 2013, and claims the benefit of Israel Application No. 222786 filed on Nov. 1, 2012.

FIELD OF THE INVENTION

The present invention relates generally to wireless communication networks and more particularly to reception enhancement in cellular communication networks.

BACKGROUND OF THE INVENTION

Repeaters for use in cellular and other communication applications, e.g. in elevator piers or in large facilities, are well known. For example, a Wifi or other router may have a range of 30-50 m surrounding it; a repeater which receives an RF signal and retransmits it, may be positioned each 20-30 meters beyond this so as to effectively extend the coverage range of the router.

Layer 1, 2 and 3 relays are known.

Many different communication protocols such as LTE, 3G UMTS, WiMAX, WiFi are known.

State of the art repeaters and associated systems are described in U.S. Pat. No. 7,003,291 to ZHNAG, U.S. Pat. Nos. 4,475,243 and 4,941,200.

The disclosures of all publications and patent documents mentioned in the specification, and of the publications and patent documents cited therein directly or indirectly, and of specifications of mentioned protocols are hereby incorporated by reference.

SUMMARY OF THE INVENTION

Certain embodiments of the present invention seek to provide at least one partial repeater which transmits critical regions of a signal and does not transmit at least one region of the signal which is not critical. Typically, in a cellular or wireless communication system, some of the downlink transmissions may include portions which are more critical than other portions. Such critical portions are referred to as "Critical Regions" herein below.

One advantage of such a partial repeater is that it conserves energy by transmitting (e.g. repeating) only selected regions of a received signal rather than transmitting the entire signal. Another advantage of such a partial repeater is that interference is diminished. Still another advantage of such a partial repeater, according to certain embodiments, is that it is possible to selectably e.g. directionally repeat regions of received signals for only those nodes in the communication network which require the repetition, while diminishing interference to those nodes which do not require the repetition and for whom the repetition constitutes interference vis a vis transmissions the non-requiring nodes are receiving from the base station.

It is appreciated that typically, several or many partial repeaters may be distributed over a geographical area occupied by nodes of a communication network. Techniques similar, mutatis mutandis, to conventional optimization of base station geo-locations may be used to determine geo-locations at which to position the partial repeaters.

Certain embodiments of the present invention seek to provide, for use with a cellular communication network having one or more stationary or mobile base stations transmitting downlink signals which are received by at least one and typically a plurality of mobile devices, a downlink signal reception enhancement system including partial repeater apparatus operative to enhance quality of reception of at least a portion of and optionally all of or only a portion of at least one downlink signal by at least one mobile device, e.g. various mobile devices on a white list. The partial repeater apparatus typically includes a downlink receiver receiving a downlink signal or more generally at least a portion of at least one downlink signal arriving from the base station; a controller including a critical region selector, operative to select only a portion of at least one individual downlink signal, e.g. to select only a critical region in some or all frames of the downlink signal; and a partial transmitter operative to generate at least one signal by regenerating, according to characteristic/s of a downlink signal and/or of the mobile device, the portion selected by the critical region selector. The partial transmitter is also operative to transmit a signal including the critical region, perhaps including only the critical region, more generally including at least the regenerated portion and including less than all of the individual downlink signal.

The present invention typically includes at least the following embodiments:

EMBODIMENT 1

For use with a cellular communication network having a base station transmitting downlink signals which are received by at least one mobile device:
a downlink signal reception enhancement system including:
 partial repeater apparatus operative to enhance quality of reception of at least a portion of at least one downlink signal by at least one mobile device, the partial repeater apparatus including:
  a downlink receiver receiving at least a portion of at least one downlink signal arriving from the base station;
  a controller including a critical region selector, operative to select only a portion of at least one individual downlink signal; and
  a partial transmitter operative to generate at least one signal by regenerating, according to at least one characteristic of at least one of a downlink signal and the mobile device, at least the portion selected by the critical region selector, and to transmit a signal including at least said regenerated portion and including less than all of the individual downlink signal.

EMBODIMENT 2

A system according to embodiment 1 wherein said regenerating includes modifying at least one characteristic of the downlink signal as received by the receiver.

EMBODIMENT 3

A system according to embodiment 2 wherein said modifying includes amplifying the downlink signal as received by the receiver in at least one direction.

EMBODIMENT 4

A system according to embodiment 2 wherein said modifying includes beam-forming for directional transmission and wherein said signal including at least said regenerated portion and including less than all of the individual downlink signal is transmitted in less than all possible azimuthal directions.

EMBODIMENT 5

A system according to embodiment 2 wherein said modifying includes time-shifting of the downlink signal as received by the receiver in at least one direction, thereby to introduce an intentional delay.

EMBODIMENT 6

A system according to embodiment 5 wherein said modifying also includes computing said intentional delay such that signals arriving at a mobile device from the partial transmitter temporally coincide with signals arriving at a mobile device from the base station

EMBODIMENT 7

A system according to embodiment 1 wherein each said signal comprises a frame.

EMBODIMENT 8

A system according to embodiment 1 wherein said repeater apparatus is operative to receive a downlink signal from the base station at a higher reception quality than at least one mobile station served by the base station.

EMBODIMENT 9

A system according to embodiment 8 wherein said partial repeater apparatus serves at least one mobile device whose geographical location results in interference hampering its reception and wherein said downlink receiver is disposed in a superior geographical location characterized by less interference capable of hampering its reception.

EMBODIMENT 10

A system according to embodiment 1 and also comprising an uplink receiver receiving an uplink signal from at least one mobile device served by the base station.

EMBODIMENT 11

A system according to embodiment 10 wherein said uplink receiver processes uplink signals sent by a plurality of mobile devices served by the base station and uses an output of said processing to select from said plurality, at least one mobile device as a target for reception enhancement.

EMBODIMENT 12

A system according to embodiment 11 wherein said output includes an indication of quality of downlink reception by an individual mobile device, included in the uplink signal sent by the individual mobile device.

EMBODIMENT 13

A system according to embodiment 11 wherein said output includes an indication of identity of an individual mobile device and wherein said uplink receiver has a mobile device white-list and is operative to select from said plurality, at least one mobile device as a target for reception enhancement by ascertaining that the mobile device is on the white-list.

EMBODIMENT 14

A system according to embodiment 1 wherein said partial repeater apparatus also comprises at least one antenna operative to receive from the base station and to transmit to the at least one mobile device.

EMBODIMENT 15

A system according to embodiment 1 wherein said portion selected by the critical region selector includes a broadcast portion of a frame and does not include at least one portion of the frame which is not broadcast and instead is transmitted to only a subset of a set of mobile devices within range of the base station.

EMBODIMENT 16

A system according to embodiment 1 wherein said portion selected by the critical region selector includes a primary synchronization signal and does not include at least one portion of the signal other than the primary synchronization signal.

EMBODIMENT 17

A system according to embodiment 1 wherein the downlink receiver is operative for receiving at least a portion of first and second signal frames arriving from the base station and wherein said partial transmitter is operative to transmit a signal which (a) includes at least a regenerated portion of the first frame (b) includes less than all of the first frame, and (c) does not include a regenerated portion of the second frame.

EMBODIMENT 18

A system according to embodiment 7 wherein said frame has a time axis and a frequency axis and wherein said portion selected by the critical region selector includes only a portion of the frame along the time axis.

EMBODIMENT 19

A system according to embodiment 7 or embodiment 18 wherein said frame has a time axis and a frequency axis and wherein said portion selected by the critical region selector includes only a portion of the frame along the frequency axis.

EMBODIMENT 20

A system according to embodiment 7 wherein said frame includes signal content addressed to a mobile station known to be suffering from poor reception and wherein said portion selected by the critical region selector includes said signal content.

EMBODIMENT 21

A system according to embodiment 7 or embodiment 20 wherein said frame includes signal content addressed to a mobile station is not known to be suffering from poor reception and wherein said portion selected by the critical region selector does not include said signal content.

EMBODIMENT 22

A system according to embodiment 7 wherein said frame includes signal content addressed to a mobile station deemed to be of high priority and wherein said portion selected by the critical region selector includes said signal content.

EMBODIMENT 23

A system according to embodiment 7 or embodiment 22 wherein said frame includes signal content addressed to a mobile station not deemed to be of high priority and wherein said portion selected by the critical region selector does not include said signal content.

EMBODIMENT 24

A system according to embodiment 7 or embodiment 22 wherein said frame includes a control and management message from the base station to at least one mobile device.

EMBODIMENT 25

A system according to embodiment 1 or embodiment 20 and wherein said portion selected by the critical region selector varies over time.

EMBODIMENT 26

A system according to embodiment 1 or embodiment 20 and wherein said portion selected by the critical region selector is constant over time.

EMBODIMENT 27

A system according to embodiment 8 wherein the downlink receiver acquires at least one downlink signal parameter characterizing the base station and emulates said parameter thereby to enhance reception of downlink signals transmitted by the base station, relative to reception of the downlink signals by at least one mobile device served by the base station.

EMBODIMENT 28

A system according to embodiment 27 wherein said downlink signal parameter characterizing the base station comprises at least one of: carrier frequency, frequency offset, phase offset, timing offset, gain, modulation scheme, and modulation scheme parameters.

EMBODIMENT 29

A system according to embodiment 1 wherein information determining inclusion of signal portions in at least one critical region is provided to said controller by a predetermined setting.

EMBODIMENT 30

A system according to embodiment 1 wherein information determining inclusion of signal portions in at least one critical region is provided to said controller by a manual user setting, which may vary from time to time.

EMBODIMENT 31

A system according to embodiment 1 wherein said partial repeater apparatus includes an internal subsystem which dynamically controls and manages critical region selection and wherein information determining inclusion of signal portions in at least one critical region is provided to said controller by said internal subsystem.

EMBODIMENT 32

A system according to embodiment 1 and also comprising an external system, connected to the reception enhancement system by a communication link, which dynamically controls and manages critical region selection, and wherein information determining inclusion of signal portions in at least one critical region is provided to said controller by said external system.

EMBODIMENT 33

A system according to embodiment 8 wherein said partial repeater apparatus serves mobile devices having antennae and wherein said downlink receiver is served by an antennae of better quality than said mobile devices' antennae.

EMBODIMENT 34

A system according to embodiment 33 wherein said downlink receiver is served by a larger number of antennae than the mobile devices are served by.

EMBODIMENT 35

A system according to embodiment 34 wherein said antennae serving said downlink receiver employ at least one of the following reception quality enhancement techniques: beam switching, Maximal Ratio Combining (MRC), beamforming.

EMBODIMENT 36

A system according to embodiment 34 wherein said antennae serving said downlink receiver are operative to mitigate at least one of: multipath, interferences and low Signal to Noise (SNR) conditions.

EMBODIMENT 37

A system according to embodiment 33 wherein said downlink receiver is served by larger size antennae than the mobile devices are served by.

EMBODIMENT 38

A system according to embodiment 33 wherein said downlink receiver is served by at least one directional antenna.

EMBODIMENT 39

A system according to embodiment 33 wherein said downlink receiver is served by at least one high gain antenna operative to enhance received signal quality in terms of SNR and interferences from other transmitters.

EMBODIMENT 40

A system according to embodiment 38 wherein the base station's location is known and the reception directional antenna is set to point toward the base station.

EMBODIMENT 41

A system according to embodiment 38 wherein the directional antenna includes functionality for tracking a moving base station's location thereby to facilitate dynamic pointing of the directional antenna toward the moving base station

EMBODIMENT 42

A system according to embodiment 9 wherein the partial repeater apparatus's distance from the base station is smaller than the distance between the mobile device and the base station.

EMBODIMENT 43

A downlink signal reception enhancement method for use with a cellular communication network having a base station transmitting downlink signals which are received by at least one mobile device, the downlink signal reception enhancement method including:
  employing partial repeater apparatus to enhance quality of reception of at least a portion of at least one downlink signal by at least one mobile device, including providing (a) a downlink receiver receiving at least a portion of at least one downlink signal arriving from the base station and (b) a controller including a critical region selector, operative to select only a portion of at least one individual downlink signal; and
  employing a partial transmitter operative to generate at least one signal by regenerating, according to at least one characteristic of at least one of a downlink signal and the mobile device, at least the portion selected by the critical region selector, and to transmit a signal including at least said regenerated portion and including less than all of the individual downlink signal.

EMBODIMENT 44

A method according to embodiment 43 wherein said base station and said mobile devices are compliant with at least one of the following cellular communication protocols: LTE, CDMA, 3G, UMAT, WIMAX.

EMBODIMENT 45

A system according to embodiment 1 and also comprising a base station transmitting the at least one downlink signal to the downlink signal reception enhancement system, thereby to provide enhanced reception to at least one mobile device served by the base station.

EMBODIMENT 46

A system according to embodiment 1 and also comprising a mobile device operative to receive a signal including at least said regenerated portion and including less than all of the individual downlink signal.

EMBODIMENT 47

A method according to embodiment 43 and also comprising positioning at least one downlink signal reception enhancement system in a geographical region, thereby to provide enhanced reception to at least one mobile device served by the base station.

EMBODIMENT 48

A method according to embodiment 47 and also comprising positioning at least one base station in a geographical region, thereby to provide enhanced reception to at least one mobile device served by the base station.

EMBODIMENT 49

A system according to embodiment 1 and also comprising a cellular communication network including:
  at least one base station transmitting downlink signals; and
  a population of mobile devices at least one of which is served by the base station and is operative to receive a signal including at least said regenerated portion and including less than all of said individual downlink signal thereby to provide enhanced reception to the at least one mobile device.

EMBODIMENT 50

A system according to embodiment 1 wherein the downlink receiver is operative for receiving at least a portion of first and second signal frames arriving from the base station and wherein said partial transmitter is operative to transmit a signal which (a) includes at least a regenerated portion of the first frame and (b) includes less than all of the first frame, and wherein said partial transmitter transmits the signal including at least said regenerated portion by transmitting said regenerated portion in the first frame and not transmitting said regenerated portion in the second frame.

EMBODIMENT 51

A method according to embodiment 43 wherein said downlink receiver is operative for demodulating and decoding said at least a portion of at least one downlink signal, thereby to generate at least one demodulated and decoded signal

EMBODIMENT 52

A method according to embodiment 51 wherein said controller includes analyzing said demodulated and decoded signal, and dynamically configuring said partial transmitter accordingly.

EMBODIMENT 53

A method according to embodiment 43 wherein said regenerating includes encoding and modulating at least the portion selected by the critical region selector.

EMBODIMENT 54

A system according to embodiment 1 wherein said partial repeater apparatus also includes a computerized storage device and wherein said apparatus stores said generated at least one signal on said storage device.

EMBODIMENT 55

A system according to embodiment 1 wherein said partial repeater apparatus also includes a computerized storage device and wherein said apparatus stores said at least one signal generated by said partial transmitter on said storage device in a first signal frame, thereby to define a stored signal, and wherein said partial transmitter uses said stored signal for transmission in a second signal frame.

EMBODIMENT 56

A system according to embodiment 55 wherein said partial transmitter uses said stored signal for periodic transmission, once per F frames where F is a natural number.

EMBODIMENT 57

A system according to embodiment 5 wherein said modifying also includes computing said intentional delay such that relative delay between signals arriving at a mobile device from the partial transmitter and signals arriving at a mobile device from the base station meets a predetermined criterion.

EMBODIMENT 58

A system according to embodiment 1 wherein downlink signal is an OFDMA signal, and wherein said portion selected by the critical region selector includes at least one OFDMA resource element.

EMBODIMENT 59

A system according to embodiment 58 wherein said downlink signal is an LTE signal.

EMBODIMENT 60

A system according to embodiment 59 wherein said one or more OFDMA resource elements include at least one of the following: PDCCH, PSS, SSS, PBCH.

EMBODIMENT 61

A system according to embodiment 1 wherein downlink signal is a CDMA signal, and wherein said portion selected by the critical region selector includes at least one CDMA resource element.

EMBODIMENT 62

A system according to embodiment 1 wherein downlink signal is a TDMA signal, and wherein said portion selected by the critical region selector includes at least one TDMA time slot.

EMBODIMENT 63

A system according to embodiment 1 wherein said portion comprises a plurality of disjoint portions of a time-frequency domain.

EMBODIMENT 64

A system according to embodiment 1 wherein said portion comprises a plurality of disjoint portions of a code domain.

EMBODIMENT 65

A computer program product, comprising a computer usable medium having a computer readable program code embodied therein, said computer readable program code adapted to be executed to implement a downlink signal reception enhancement method for use with a cellular communication network having a base station transmitting downlink signals which are received by at least one mobile device, the downlink signal reception enhancement method including:
  employing partial repeater apparatus to enhance quality of reception of at least a portion of at least one downlink signal by at least one mobile device, including providing (a) a downlink receiver receiving at least a portion of at least one downlink signal arriving from the base station and (b) a controller including a critical region selector, operative to select only a portion of at least one individual downlink signal; and
  employing a partial transmitter operative to generate at least one signal by regenerating, according to at least one characteristic of at least one of a downlink signal and the mobile device, at least the portion selected by the critical region selector, and to transmit a signal including at least said regenerated portion and including less than all of the individual downlink signal.

Typically, the downlink signal reception enhancement system "helps" mobile devices and also "helps" moving relays having mobile station functionality.

Also provided is a computer program comprising computer program code means for performing any of the methods shown and described herein when said program is run on a computer; and a computer program product, comprising a typically non-transitory computer-usable or -readable medium or computer readable storage medium, typically tangible, having a computer readable program code embodied therein, said computer readable program code adapted to be executed to implement any or all of the methods shown and described herein. It is appreciated that any or all of the computational steps shown and described herein may be computer-implemented. The operations in accordance with the teachings herein may be performed by a computer specially constructed for the desired purposes or by a general purpose computer specially configured for the desired purpose by a computer program stored in a typically non-transitory computer readable storage medium.

Any suitable processor, display and input means may be used to process, display e.g. on a computer screen or other computer output device, store, and accept information such as information used by or generated by any of the methods and apparatus shown and described herein; the above processor, display and input means including computer programs, in accordance with some or all of the embodiments of the present invention. Any or all functionalities of the invention shown and described herein, such as but not limited to steps of flowcharts, may be performed by a conventional personal computer processor, workstation or other programmable device or computer or electronic computing device or processor, either general-purpose or specifically constructed, used for processing; a computer display screen and/or printer and/or speaker for displaying; machine-readable memory such as optical disks, CDROMs, magnetic-optical discs or other discs; RAMs, ROMs, EPROMs, EEPROMs, magnetic or optical or other cards, for storing, and keyboard or mouse for accepting. The term "process" as used above is intended to include any type of computation or manipulation or transformation of data represented as physical, e.g. electronic, phenomena which may occur or reside e.g. within registers and/or memories of a computer or processor. The term processor includes a single processing unit or a plurality of distributed or remote such units.

The above devices may communicate via any conventional wired or wireless digital communication means, e.g. via a wired or cellular telephone network or a computer network such as the Internet.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may wherever suitable operate on signals representative of physical objects or substances.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

Elements separately listed herein need not be distinct components and alternatively may be the same structure.

Any suitable input device, such as but not limited to a sensor, may be used to generate or otherwise provide information received by the apparatus and methods shown and described herein. Any suitable output device or display may be used to display or output information generated by the apparatus and methods shown and described herein. Any suitable processor may be employed to compute or generate information as described herein e.g. by providing one or more modules in the processor to perform functionalities described herein. Any suitable computerized data storage e.g. computer memory may be used to store information received by or generated by the systems shown and described herein. Functionalities shown and described herein may be divided between a server computer and a plurality of client computers. These or any other computerized components shown and described herein may communicate between themselves via a suitable computer network.

The following terms may be construed either in accordance with any definition thereof appearing in the prior art literature or in accordance with the specification, or as follows:

"Mobile communication device", also termed herein "mobile device" and "mobile station", includes any conventional mobile telephone such as but not limited to smart phones, and iphones, and generally includes all other mobile e.g. portable e.g. handheld or pocket sized devices with cellular communication capabilities.

The term "controller" is intended to include any hardware, software, or firmware e.g. FPGA operative to receive data, perform computations on the data and to control external devices accordingly.

BRIEF DESCRIPTION OF THE DRAWINGS

Certain embodiments of the present invention are illustrated in the following drawings:

FIG. 1b (Prior Art) depicts a cellular system comprising a plurality of cells 100, each of the cells is described above regarding FIG. 1a.

Computational components described and illustrated herein can be implemented in various forms, for example, as hardware circuits such as but not limited to custom VLSI circuits or gate arrays or programmable hardware devices such as but not limited to FPGAs, or as software program code stored on at least one intangible computer readable medium and executable by at least one processor, or any suitable combination thereof. A specific functional component may be formed by one particular sequence of software code, or by a plurality of such, which collectively act or behave or act as described herein with reference to the functional component in question. For example, the component may be distributed over several code sequences such as but not limited to objects, procedures, functions, routines and programs and may originate from several computer files which typically operate synergistically.

Data can be stored on one or more intangible computer readable media stored at one or more different locations, different network nodes or different storage devices at a single node or location.

It is appreciated that any computer data storage technology, including any type of storage or memory and any type of computer components and recording media that retain digital data used for computing for an interval of time, and any time of information retention technology, may be used to store the various data provided and employed herein. Suitable computer data storage or information retention apparatus may include apparatus which is primary, secondary, tertiary or off-line; which is of any type or level or amount or category of volatility, differentiation, mutability, accessibility, addressability, capacity, performance and energy use; and which is based on any suitable technologies such as semiconductor, magnetic, optical, paper and others.

DETAILED DESCRIPTION OF CERTAIN EMBODIMENTS

Figure 1A:
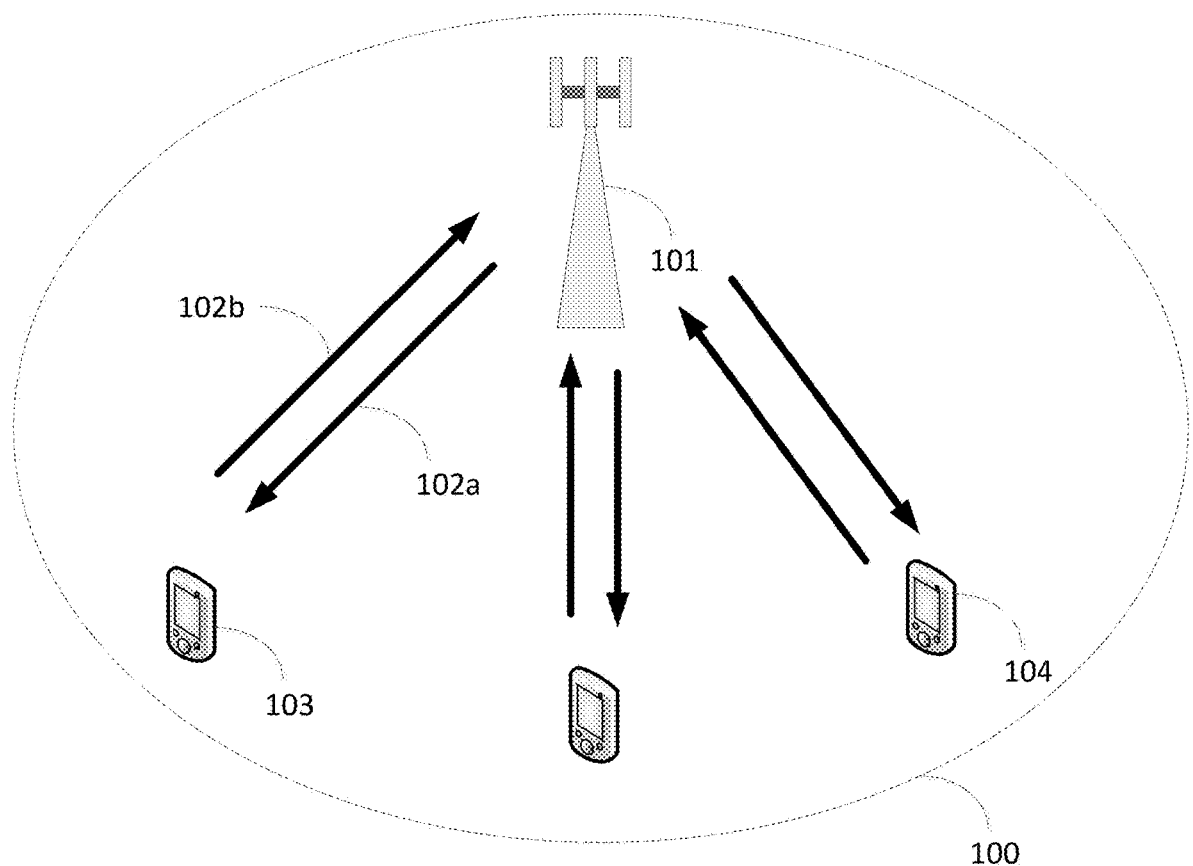
FIG. 1a (Prior Art) depicts a typical cell or other network portion 100 in a wireless e.g. cellular communication system.

FIG. 1a (Prior Art) depicts a typical cell or other network portion 100 in a wireless e.g. cellular communication system. A base station 101 transmits and receives signals to and from a plurality of mobile stations within its geographical coverage area. Such mobile stations are noted as 103 and 104. Each mobile station transmits an Uplink signal 102b to base station 101, and receives a Downlink signal 102a from base station 101. The communication system may be a cellular system, or alternatively any other wireless network.

The wireless communication system may implement one of the cellular standards, one of the wireless communication standards, or may implement some proprietary communication signals and protocols. For example, a cellular communication system may implement the 3GPP LTE standard, the WiMAX standard, the 3GPP WCDMA, HSPA or any other cellular standard. As a further example, the wireless communication system may implement one of the 802.11 WiFi standards.

Downlink 102a and Uplink 102b signals may be transmitted using TDMA, CDMA, FDMA, OFDMA, or any other method or combination of methods.

Figure 1B:
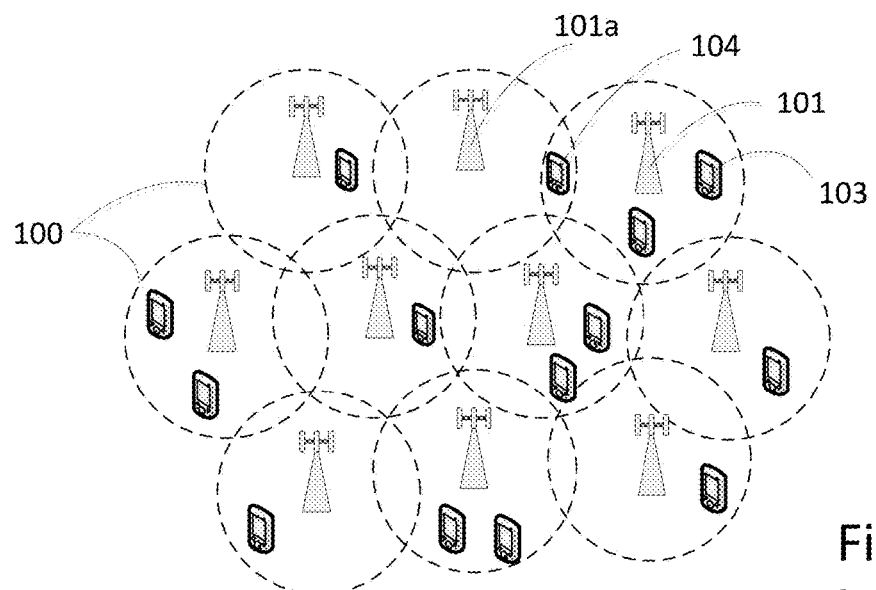

FIG. 1b (Prior Art) depicts a cellular system comprising a plurality of cells 100, each of the cells is described above regarding FIG. 1a. Some of the mobile stations may receive the downlink signals from their serving base stations in low quality. Such low quality signals may be caused by multipath, fading, inter-cell interferences, attenuation, or any other cause or combination of such. In such conditions, it is difficult for the mobile station to maintain proper reception of the downlink signals from the base station.

For example, in one of the cells, base station 101 serves the mobile stations 103 and 104, amongst other mobile stations. Mobile station 104 also happens to reside within the geographical coverage area of base station 101a; therefore Mobile station 104 receives downlink signals from 2 base stations 101 and 101a, which causes lower quality reception of the desired downlink signal from base station 101.

Typically, in a cellular or wireless communication system, some of the downlink transmissions may include portions which are more critical than other portions. Such critical portions are referred to as "Critical Regions" herein below.

One example of a Critical Region is downlink synchronization signals, which are critical for the proper reception of the remaining downlink transmission. Another example is control and management messages, such as but not limited to For example, the DL-MAP signal in WiMAX, the PDCCH signal in LTE and CCPCH signal in 3G UMTS, that the base station sends to the mobile stations; such control and management messages may be critical for proper reception of the downlink transmission.

Another example of a Critical Region is a portion of a downlink signal addressed to a mobile station which receives the downlink transmission in low quality, as described above. Another example is a portion of a downlink signal addressed to a mobile station which is a preferred mobile station (i.e. has greater importance or higher priority over the other mobile stations).

Such Critical Regions may vary from time to time, or from frame to frame. Such variations may be for example in the content (information) carried by the critical region, or in the critical region allocation within the frame.

Alternatively, the Critical Regions may be fixed, either by their content or by their allocation. Further alternatively, they may vary slowly, for example be fixed for several consecutives frames and then be changed.

FIGS. 2a-2c, 3, 4a-4c and 5 depict various examples of Critical Regions, as described below.

Figure 2A:
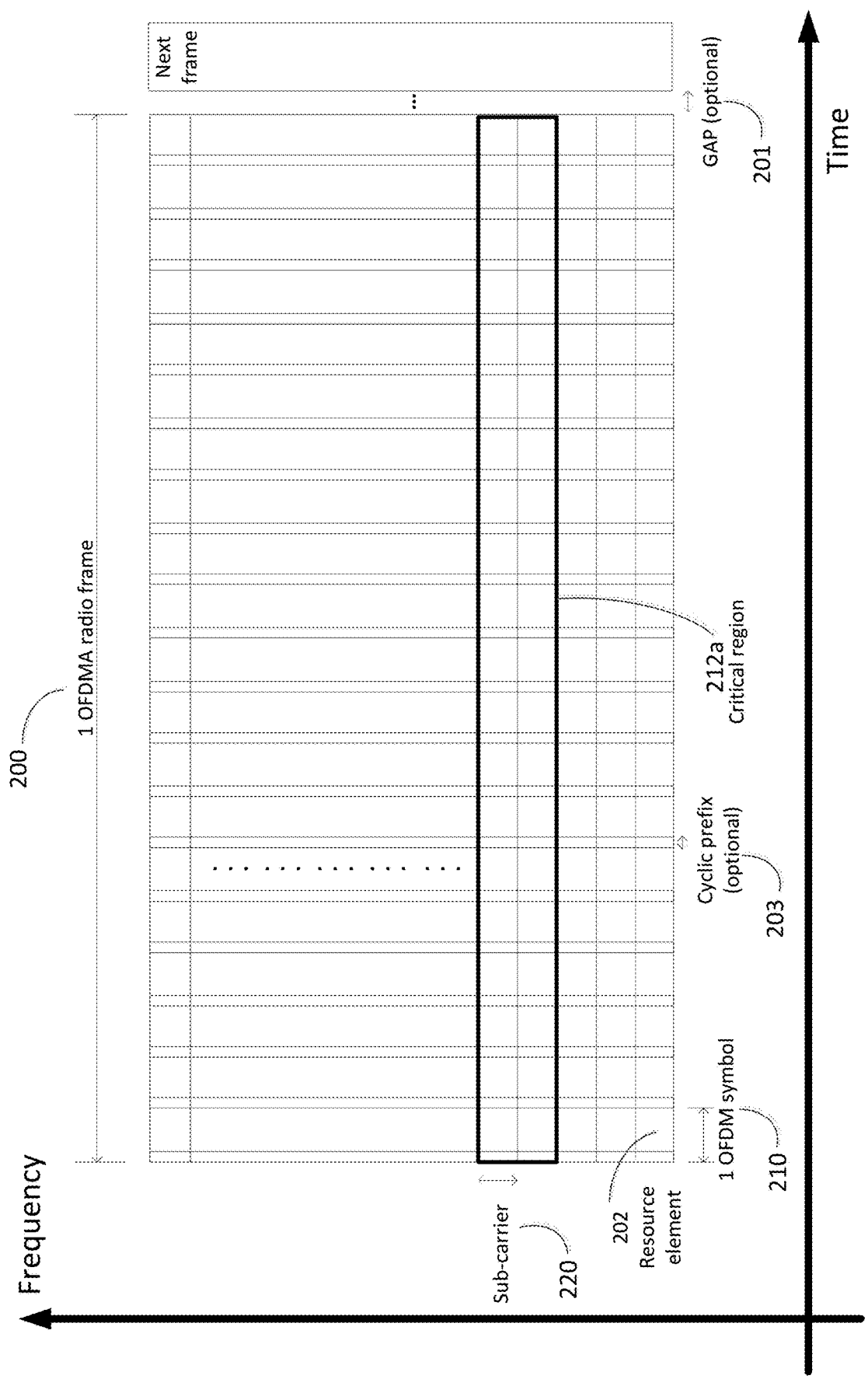
FIG. 2a depicts an OFDMA radio downlink frame 200, in an OFDMA communication system including a critical region which is a portion of subcarrier/s along the whole duration of the frame.

FIG. 2a depicts an OFDMA radio downlink frame 200, in an OFDMA communication system. Frame 200 comprises a plurality of OFDM symbols 210 in the time domain, and a plurality of subcarriers 220 in the frequency domain. An optional Gap 201 may be placed between successive frames 200. An optional Cyclic Prefix 203 may be provided between successive OFDM symbols in the time domain. The basic resource which can be allocated in the downlink transmission frame is resource element 202, which is the transmission of one subcarrier during one OFDM symbol length in time. In this example a critical region 212a is a portion of the subcarriers (one, two or more) along the whole duration of the frame 200. More than one such critical region may exist in the frame.

Figure 2B:
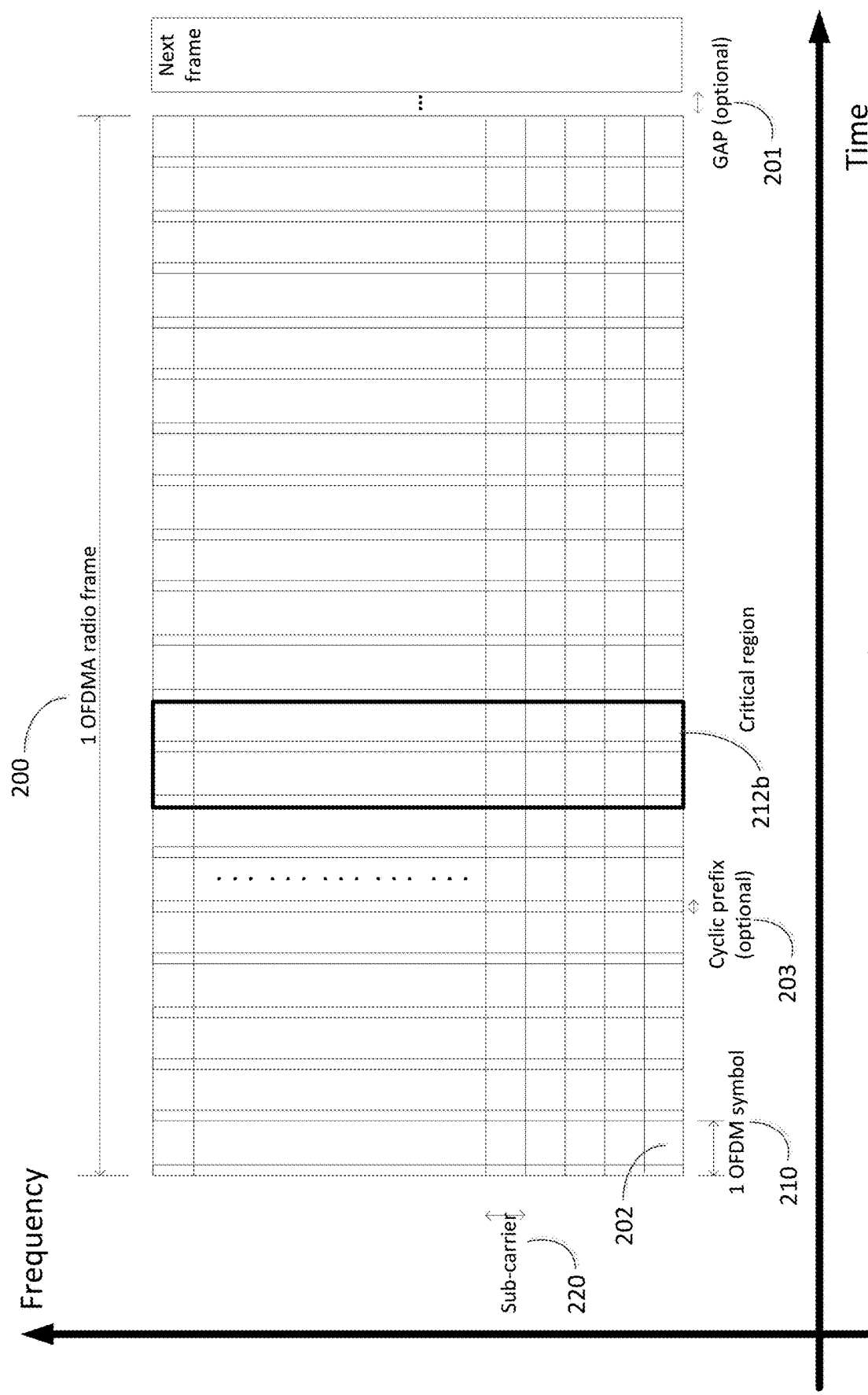
FIG. 2b depicts another example of an OFDMA radio downlink frame 200, in which the critical region 212b is a portion of OFDM symbol/s in the frame along the whole frequency subcarriers of the frame.

FIG. 2b depicts another example of an OFDMA radio downlink frame 200, in which the critical region 212b is a portion of the OFDM symbols in the frame (one, two or more OFDM symbols) along the whole frequency subcarriers of the frame 200. More than one such critical region may exist in the frame.

Figure 2C:
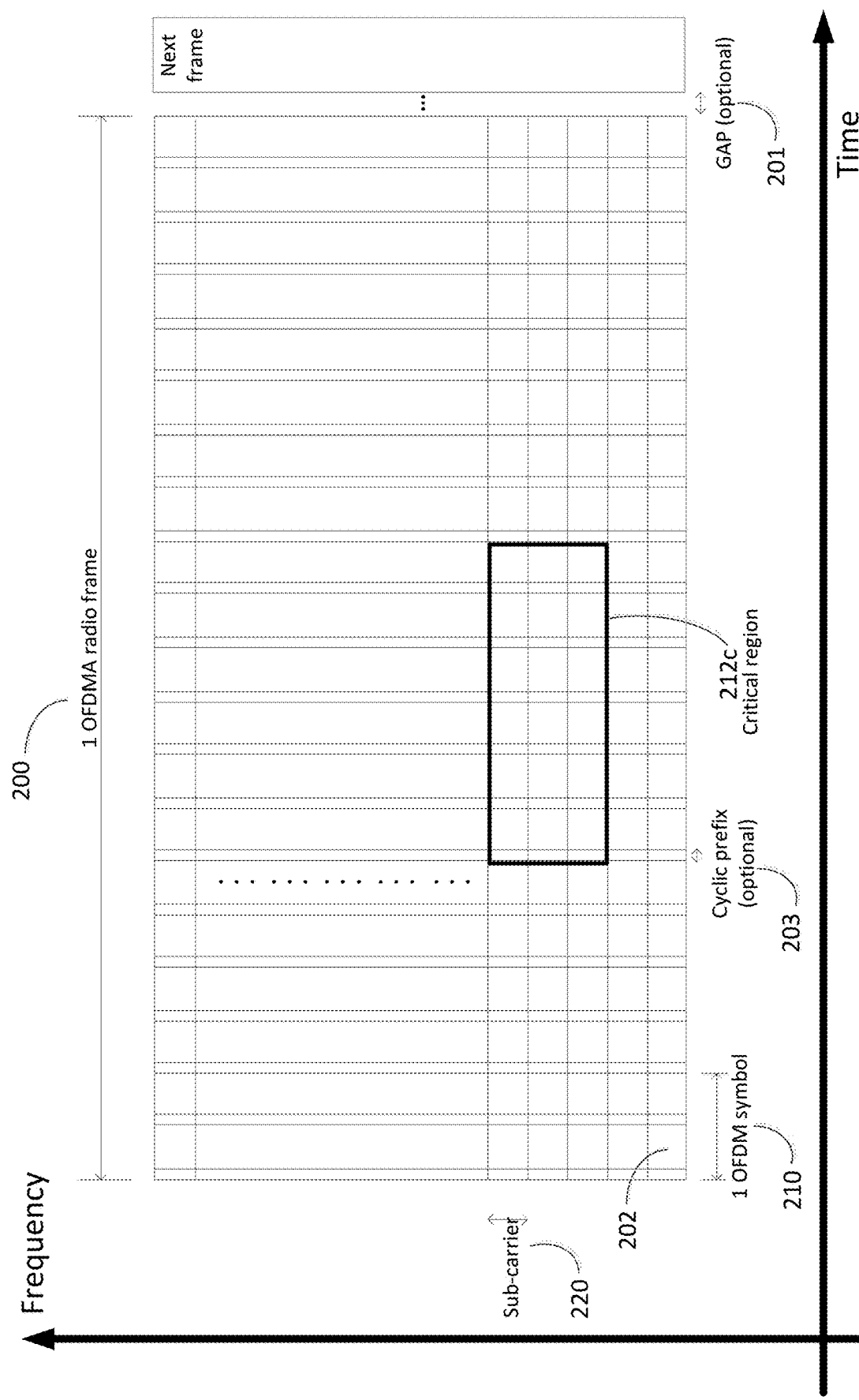
FIG. 2c depicts another example of an OFDMA radio downlink frame 200, in which a critical region 212c is a portion of both the OFDM symbols in the frame (e.g. one, two or more OFDM symbols) and a portion of the subcarriers (e.g. one, two or more) of the frame 200. More than one such critical region may exist in the frame.

FIG. 2c depicts another example of an OFDMA radio downlink frame 200, in which the critical region 212c is a portion of both the OFDM symbols in the frame (one, two or more OFDM symbols) and a portion of the subcarriers (one, two or more) of the frame 200. More than one such critical region may exist in the frame.

The critical region in an OFDMA system may comprise any partial set of the resource elements 202 in frame 200, or any combination of the examples above.

Figure 3:
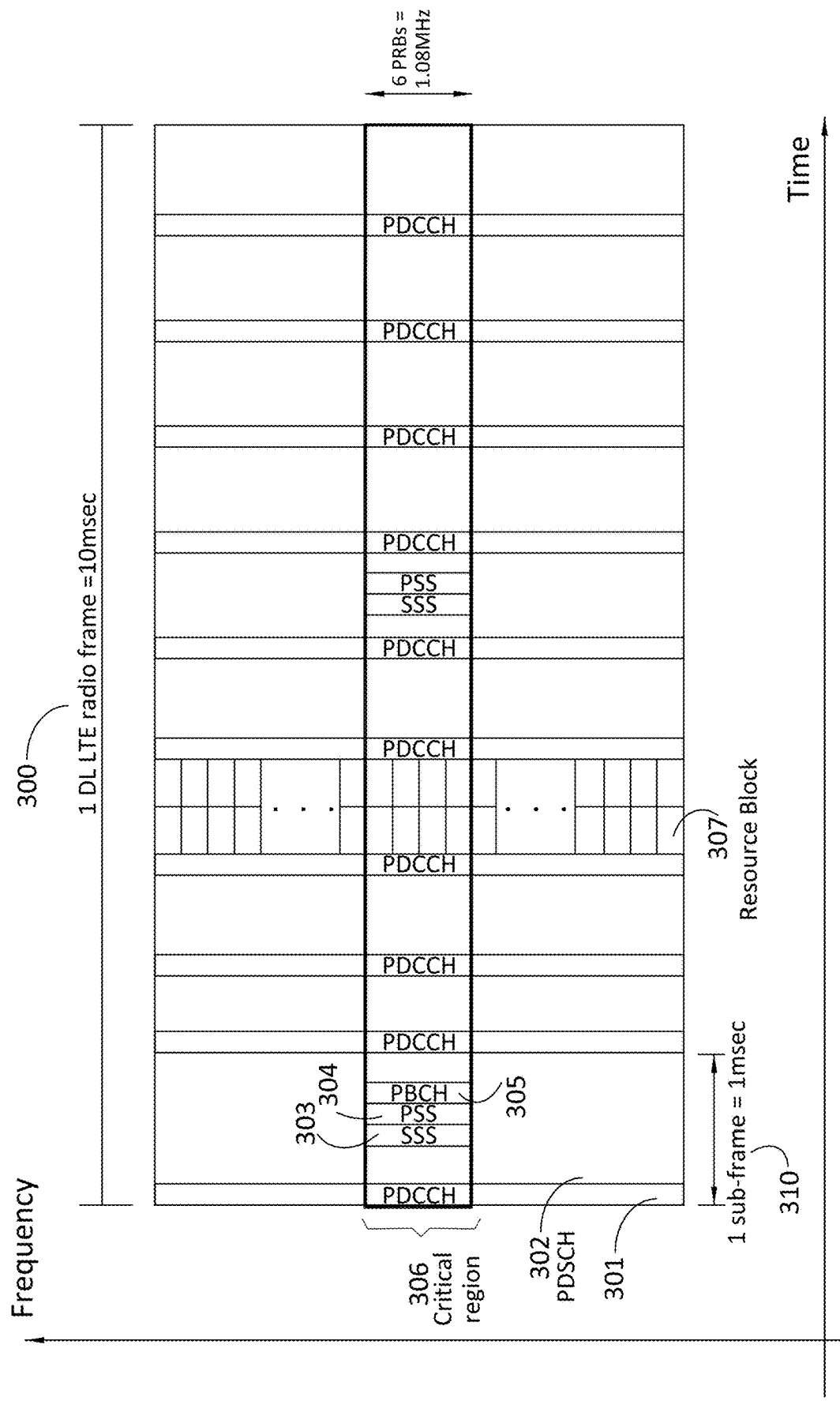
FIG. 3 illustrates a suitable critical region for LTE applications according to one embodiment of the invention.

FIG. 3 illustrates a critical region suitable for LTE applications according to one embodiment of the invention. As shown, an LTE radio downlink (DL) frame 300 has a duration of, say, 10 msec, in an LTE cellular communication system. Frame 300 comprises a plurality of LTE physical resource blocks (PRBs) 307 which may be a subset of 6 OFDMA symbols in time and 12 sub-carriers in frequency. The DL (downlink) frame also comprises LTE sub-frames such as that shown at reference numeral 310 (its duration is, say, 1 msec). The LTE DL (downlink) frame in the illustrated embodiment, is of the FDD (Frequency Division Duplex) type, however TDD (Time Division Duplex) type of DL (downlink) frames can be employed similarly.

As shown, the LTE DL (downlink) frame includes several physical channels or signals e.g some or all of: Physical DL (downlink) Control Channel (PDCCH) 301, Physical DL (downlink) Shared Channel (PDSCH) 302, Secondary Synchronization Signal (SSS) 303, Primary Synchronization Signal (PSS) 304 and Physical Broadcast Channel (PBCH) 305. Each of these channels or signals or any subset thereof may be deemed critical to LTE system operation. In the illustrated embodiment, merely by way of example, the critical region 306 is a portion of six (6) PRB located in the center of the frequency bandwidth of the system along the entire duration of frame 300. The reason for choosing this portion as a critical region may be that this region includes the physical channels and signals to be employed for the initial synchronization, attachment or cell-reselection of mobile stations (e.g. UE=user equipment) to the base station transmitting these channels or signals.

This critical region 306 may include the PSS which is the first signal that the mobile station searches in order to synchronize to the base station DL (downlink) symbols and sub-frames 310 (frequency and time synchronization). In addition the critical region may include the SSS which is thereafter used by the mobile station to synchronize to the base station DL (downlink) frame 300 and which, together with the PSS, assists in determining the Cell ID (identity). Moreover critical region 306 may include the PBCH which is thereafter demodulated and decoded in order to receive basic system information (e.g. Master Information Block=MIB) from the base station. The basic system information so received may include information about the DL (downlink) cell bandwidth, information about the PHICH (Physical HARQ Indicator Channel) configuration, System Frame Number (SFN) and/or number of transmit antennae.

Figure 4A:
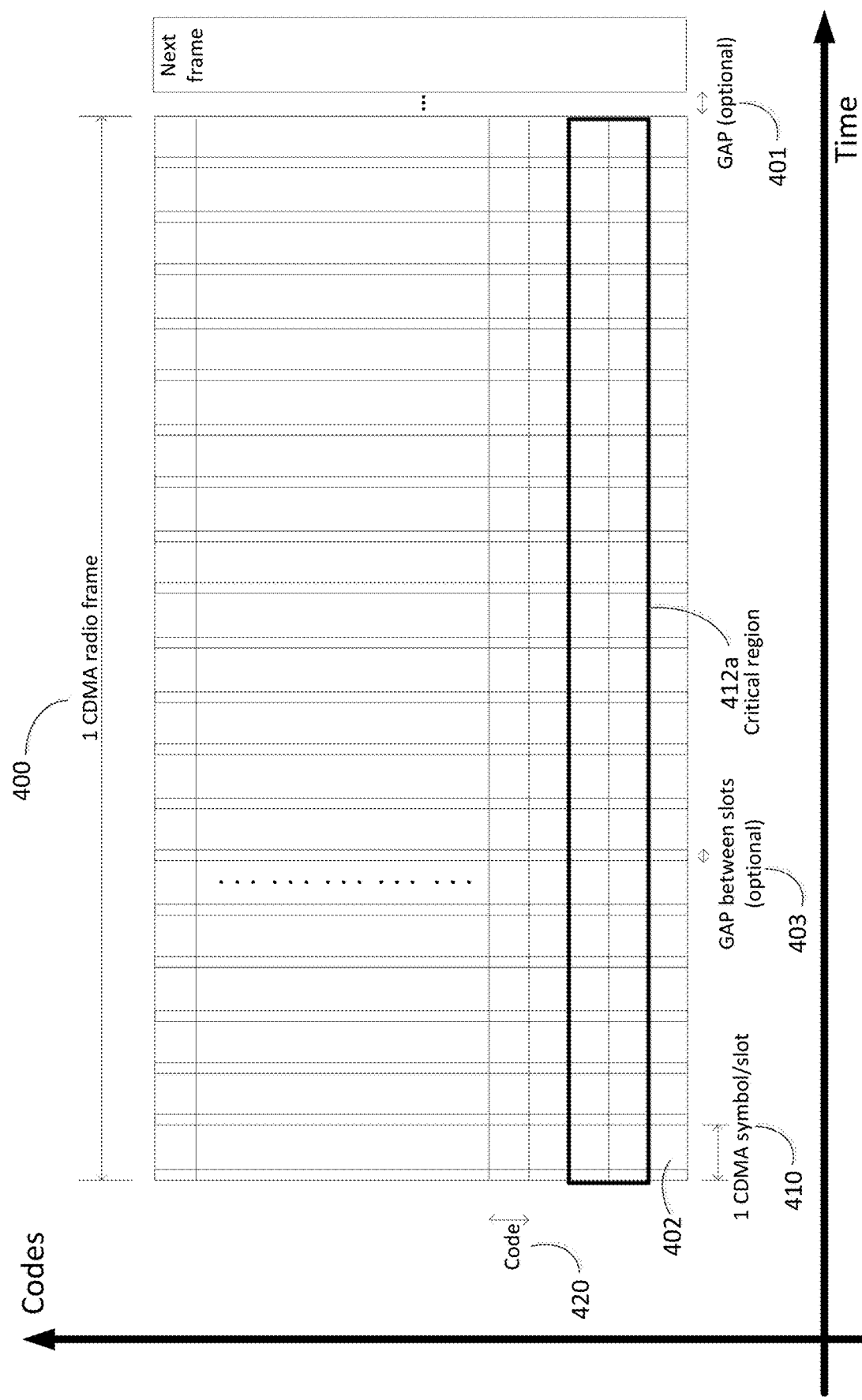
FIG. 4a depicts a CDMA radio downlink frame 400, in a CDMA communication system including a critical region 412a which includes a portion of CDMA codes extending along the entire duration of the frame.

FIG. 4a illustrates a CDMA radio downlink frame 400, in a CDMA communication system. Frame 400 typically comprises a plurality of CDMA symbols or slots 410 in the time domain, and a plurality of CDMA codes 420 in the code domain. Each CDMA symbol typically comprises a series of CDMA chips. A gap 401 may optionally be provided between successive frames 400. Alternatively or in addition, an additional gap 403 may be provided between successive CDMA slots 410. A Resource element 402 is a basic resource which may be allocated in the downlink transmission frame. Resource element 402 is the transmission of one CDMA code during one CDMA slot length in time. In this example a critical region 412a is a portion of the CDMA codes (one, two or more) along the whole duration of the frame 400. More than one such critical region may exist in the frame.

Figure 4B:
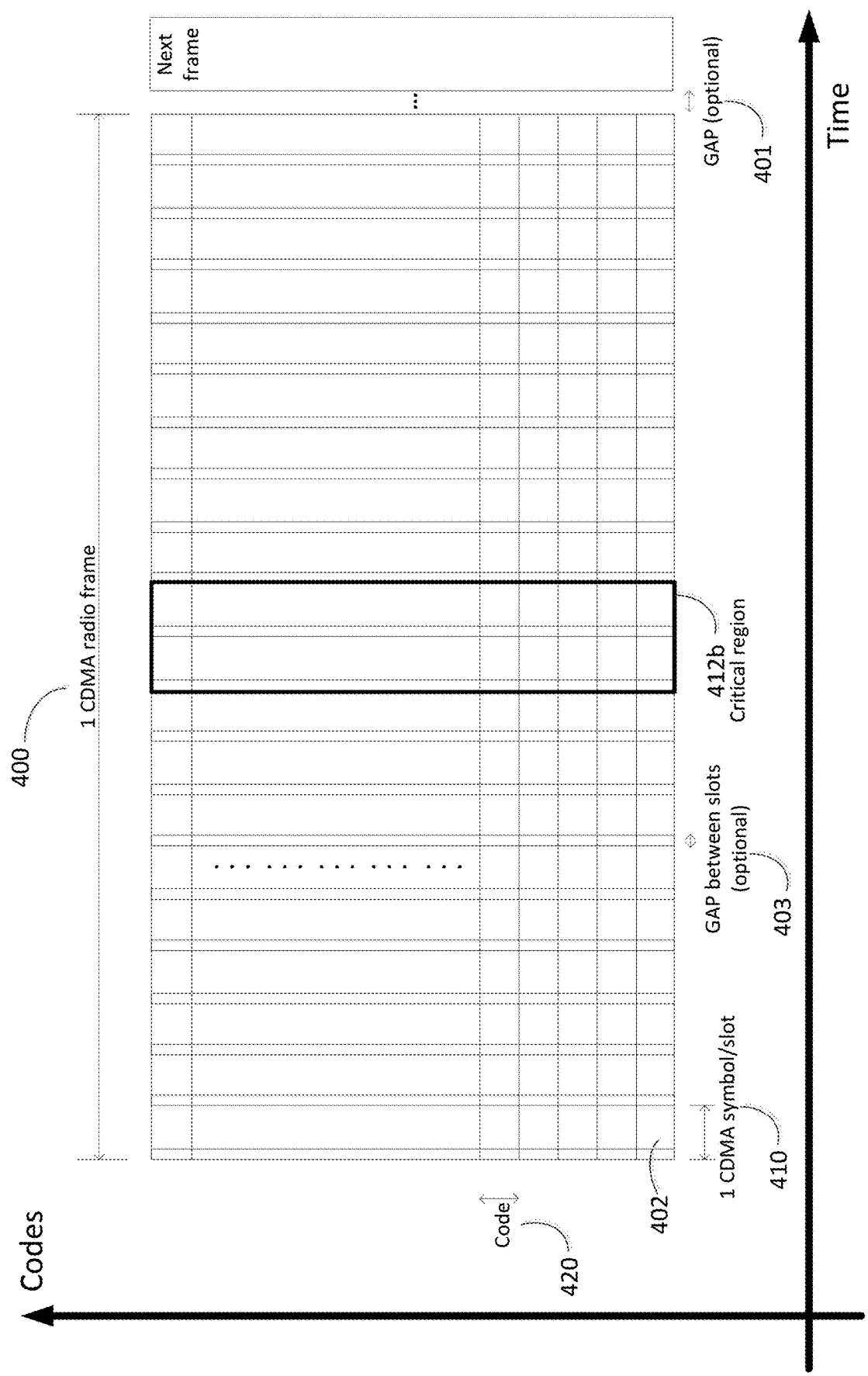
FIG. 4b depicts another example of CDMA radio downlink frame 400, in which the critical region 412b includes a portion of CDMA slots in the frame along the entire range of CDMA codes of the frame.

FIG. 4b illustrates another example of CDMA radio downlink frame 400, in which the critical region 412b is a portion of CDMA slots or symbols in the frame along the whole CDMA codes of the frame. More than one such critical region may exist in the frame.

Figure 4C:
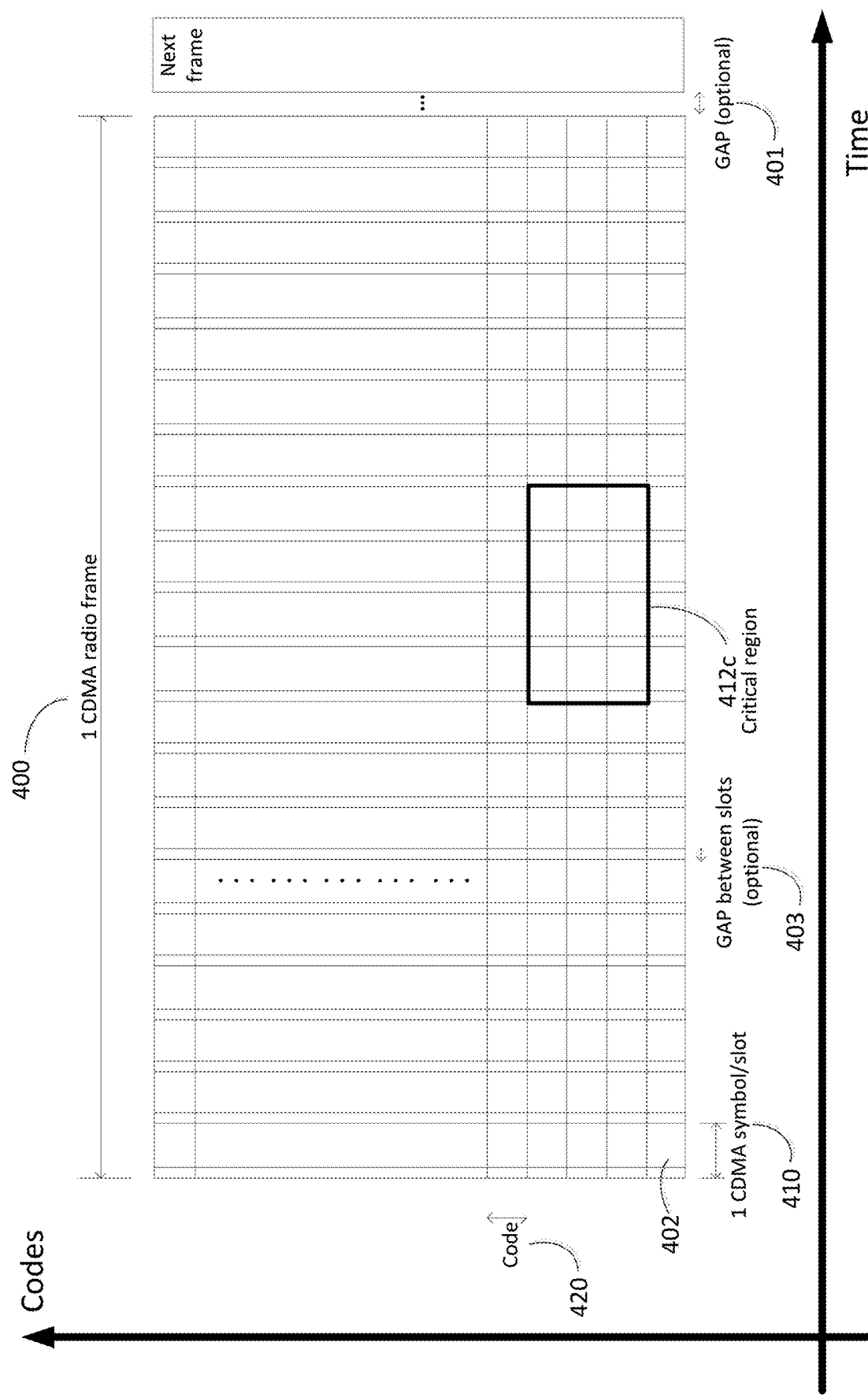
FIG. 4c depicts another example of a CDMA radio downlink frame 400, in which the critical region 412c is "two-dimensional" in that it includes a portion of both the CDMA codes in the frame (e.g. one, two or more CDMA codes) and a portion of the CDMA slots (e.g. one, two or more) of the frame 400. More than one such critical region may exist in the frame.

FIG. 4c depicts another example of a CDMA radio downlink frame 400, in which the critical region 412c is "two-dimensional" in that it includes both a portion of both the CDMA codes in the frame (one, two or more CDMA codes) and a portion of the CDMA slots (one, two or more) of the frame 400. More than one such critical region may exist in the frame.

The critical region in CDMA system may comprise any partial set of the resource elements 402 in frame 400. The critical region in CDMA system may comprise any combination of the examples above.

Figure 5:
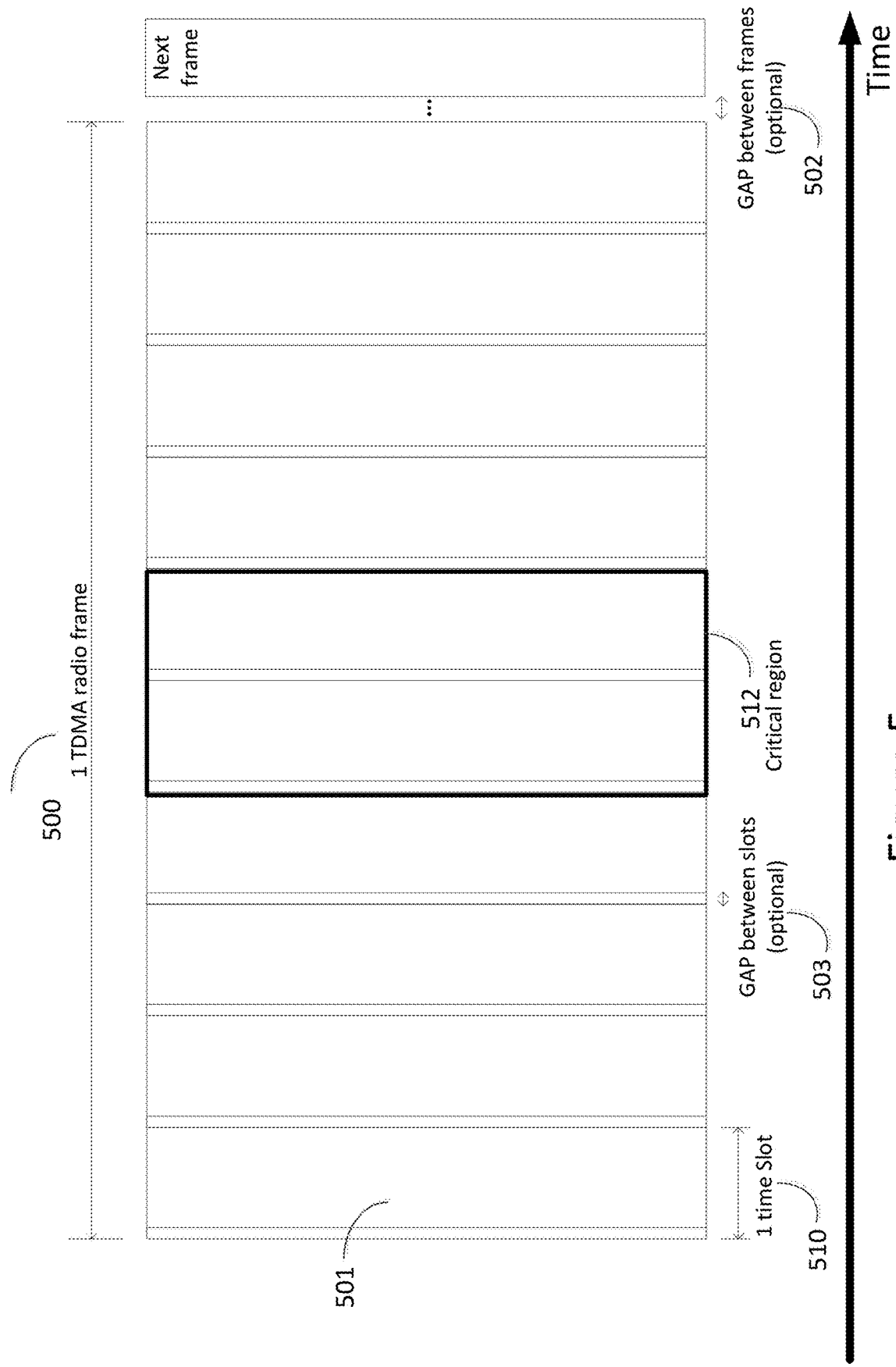
FIG. 5 depicts a TDMA radio downlink frame 500 in a TDMA communication system including a critical region 512 which is a portion of the TDMA time slots along the duration of the frame. More than one such critical region may exist in the frame.

FIG. 5 illustrates a TDMA radio downlink frame 500, in a TDMA communication system. Frame 500 typically comprises a plurality of TDMA time slots 510 in the time domain. An gap 502 may optionally be provided between successive frames 500. Alternatively or in addition, a gap 503 may optionally be provided between successive time slots 510. The basic resource to be allocated in the downlink transmission frame is resource element 501, which is the transmission of one TDMA time slot. In this example a critical region 512 is a portion of the TDMA time slots (one, two or more) along the duration of the frame 500. More than one such critical region may exist in the frame.

Figure 6:
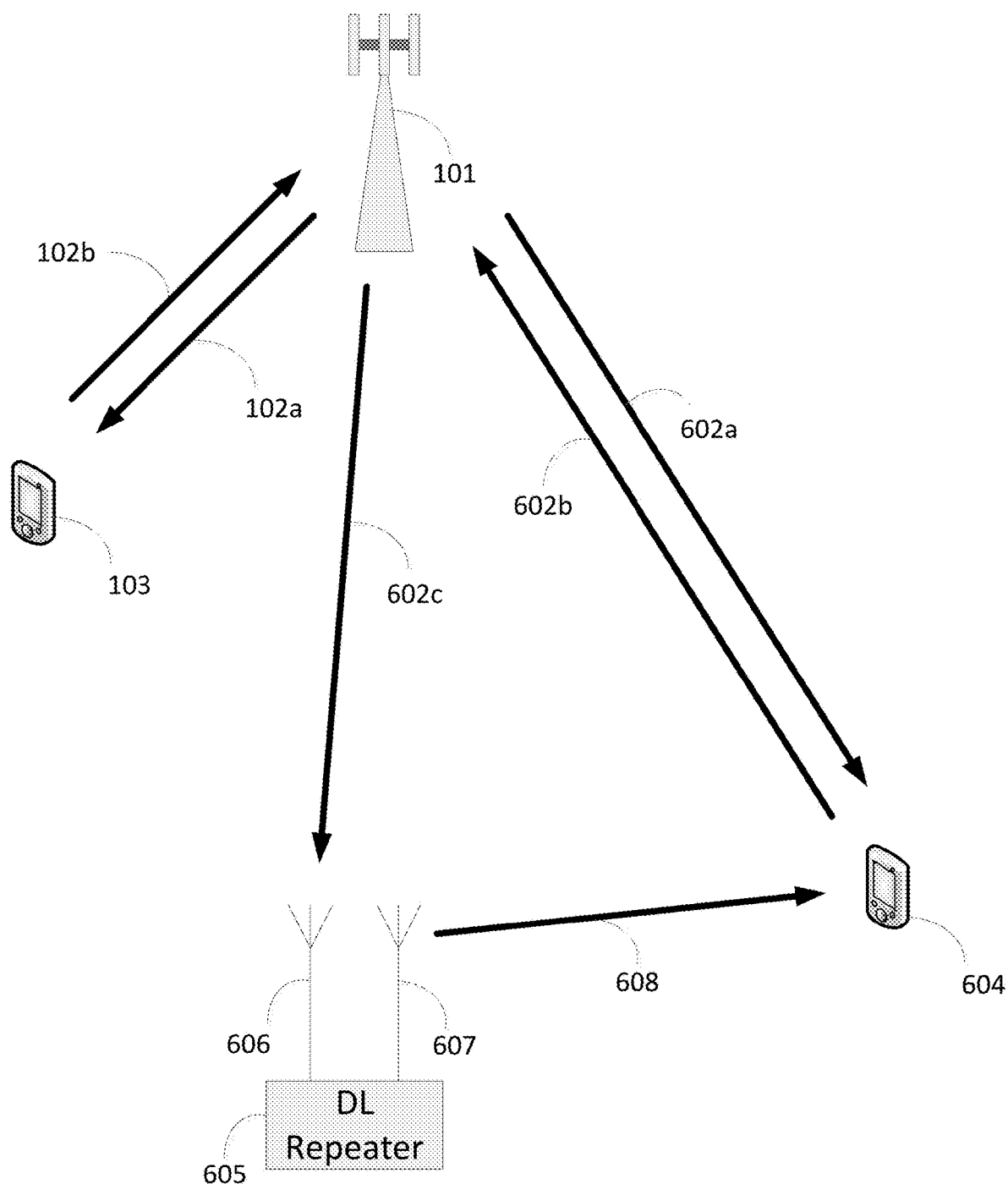
FIG. 6 is a semi-pictorial, semi-block diagram illustration of a cellular communication system in accordance with an embodiment of the present invention.

FIG. 6 is a semi-pictorial, semi-block diagram illustration of a cellular communication system in accordance with an embodiment of the present invention. Base station 101 serves a plurality of mobile stations, amongst them mobile station 103 and mobile station 604. While mobile station 103 receives the downlink signal 102*a* at a proper quality, mobile station 604 receives the downlink signal 602*a* at a low quality. According to some embodiments, mobile station 604 cannot receive downlink signal 602*a* at all.

Downlink signals 602*a* and 102*a* may be the same originated signal, but vary from each other when received by the mobile stations due to the attenuation, multipath, noise and other channel conditions. Alternatively, downlink signals 602*a* and 102*a* may be different, as a result of the communication protocol.

More than one mobile station in the cell may receive its downlink signal at a low quality. Furthermore, all of the mobile stations in the cell may receive the downlink signal at a low quality.

In order to improve the quality of the downlink signal reception by mobile stations such as mobile station 604, a DL (downlink) repeater 605 or an entire population thereof, may be provided. DL (downlink) repeater 605 receives at least portions of the downlink signal transmitted by the base station 101 to the mobile station 604. Said portions of the downlink signal are referred to hereinafter as 602*c*. Downlink signal 602*c* may be the same originated signal 602*a* or portions thereof. For example, DL (downlink) repeater 605 may be configured to receive only one or more critical regions within the DL (downlink) frame, and these portions are referred as signal 602*c*. Alternatively, signal 602*c* may vary from its corresponding portions in 602*a* when received by the DL (downlink) repeater 605, e.g. due to attenuation, multipath, noise and other channel conditions which may be different from those of mobile station 604.

Typically, DL (downlink) repeater 605 acquires the downlink signal parameters and adjusts its receiver to properly receive the downlink signals transmitted by base station 101. For example, DL (downlink) repeater 605 may acquire one or more of the carrier frequency, frequency offset, phase offset, timing offset, gain, modulation scheme and parameters, and any other signal parameters needed for proper reception of the downlink signals.

Typically, downlink signal 602*c* comprises at least one critical region within the downlink frame, e.g. as described above regarding the alternative embodiments of FIGS. 2*a*-5. Typically, DL (downlink) repeater 605 is provided with the information of which regions are the said at least one critical region. Information determining which signal content or signal locations are to be included in at least one critical region may be provided to the DL (downlink) repeater 605 by a predetermined setting. Alternatively or in addition, such information may be provided to the DL (downlink) repeater 605 by manual user setting, which may vary from time to time. Alternatively or in addition, such information may be provided to the DL (downlink) repeater 605 by internal subsystem of the DL (downlink) repeater itself, which dynamically controls and manages the critical region reception. Alternatively or in addition, such information may be provided to the DL (downlink) repeater 605 by an external system, connected to the DL (downlink) repeater 605 by suitable communication such as fiber optics, a link of the communication network itself, and so forth, such that said external system dynamically controls and manages critical region selection.

Typically, DL (downlink) repeater 605 transmits a repeated signal 608. The repeated signal 608 may comprise at least a portion of the downlink signal 602*c*. Alternatively or in addition the repeated signal 608 may comprise at least a modified portion of the received downlink signal 602*c*. Such a modification may be, for example, one or more of the following: amplification, time shift, frequency shift, equalization, filtering, etc. Further, such a modification may be generated by the DL (downlink) repeater 605 by demodulating and decoding the data of the downlink signal 602*c*, and then recoding and remodulating at least portions of it to form the repeated signal 608. Typically, the repeated signal 608 comprises at least a portion of a critical region of the downlink signal 602*c*. The repeated signal 608 may comprise at least the entire critical region or regions needed for the mobile station 604.

DL (downlink) repeater 605 may comprise a single antenna 606, which is used for both reception of signal 602*c*, and for the transmission of the repeated signal 608. Furthermore, DL (downlink) repeater 605 may use more than one antenna. DL repeater 605 may use antenna 606 for reception of signal 602*c*, and antenna 607 for the transmission of the repeated signal 608. Several antennas may be used for reception or for transmission.

A geographical coverage area may be provided to the DL repeater 605 which defines which mobile stations are to be served by the repeater in that a mobile station is served by the repeater if and only if that mobile station is inside the geographical coverage area. Said provided geographical coverage area may be predetermined, or based on predetermined settings, or may be provided to the DL repeater 605 by manual user setting, which may vary from time to time. Further, it may be provided to the DL repeater 605 by the internal subsystem of the DL repeater itself, which dynamically controls and manages the geographical coverage area. For example, the DL repeater 605 may sense the uplink signals transmitted by mobile station 604, and adjust the geographical coverage area accordingly. Further, the geographical coverage area may be provided to the DL repeater 605 by an external system, connected to the DL repeater 605 by communication means, said external system dynamically controls and manages the geographical coverage area.

Further, DL repeater 605 may use a beam-forming scheme for the reception of signal 602*c* or for the transmission of the repeated signal 608. The beam-forming of the transmission of the repeated signal 608 may be based on said provided geographical coverage area. The DL repeater 605 may sense the uplink signals transmitted by mobile station 604, and adjust the beam-forming accordingly.

Further, the DL repeater 605 may receive the downlink signals related to more than one mobile station, and may transmit a repeated signal to more than one mobile station, said repeated signal comprising critical region or regions relevant to more than one mobile station. Further, DL repeater 605 may transmit a plurality of repeated signals, each comprising at least a portion of a critical region, for a plurality of mobile stations correspondingly.

The repeated signal 608 may be transmitted with a higher transmission power (say, 100 W) than the received power level of signal 602*c* (say, 1 W). Further, the DL repeater 605 may transmit signal 608 with a power level higher than the original power transmitted by base station 101. Further, DL repeater 605 may dynamically control the transmitted power level of signal 608 according to said provided geographical coverage area.

Figure 8A:
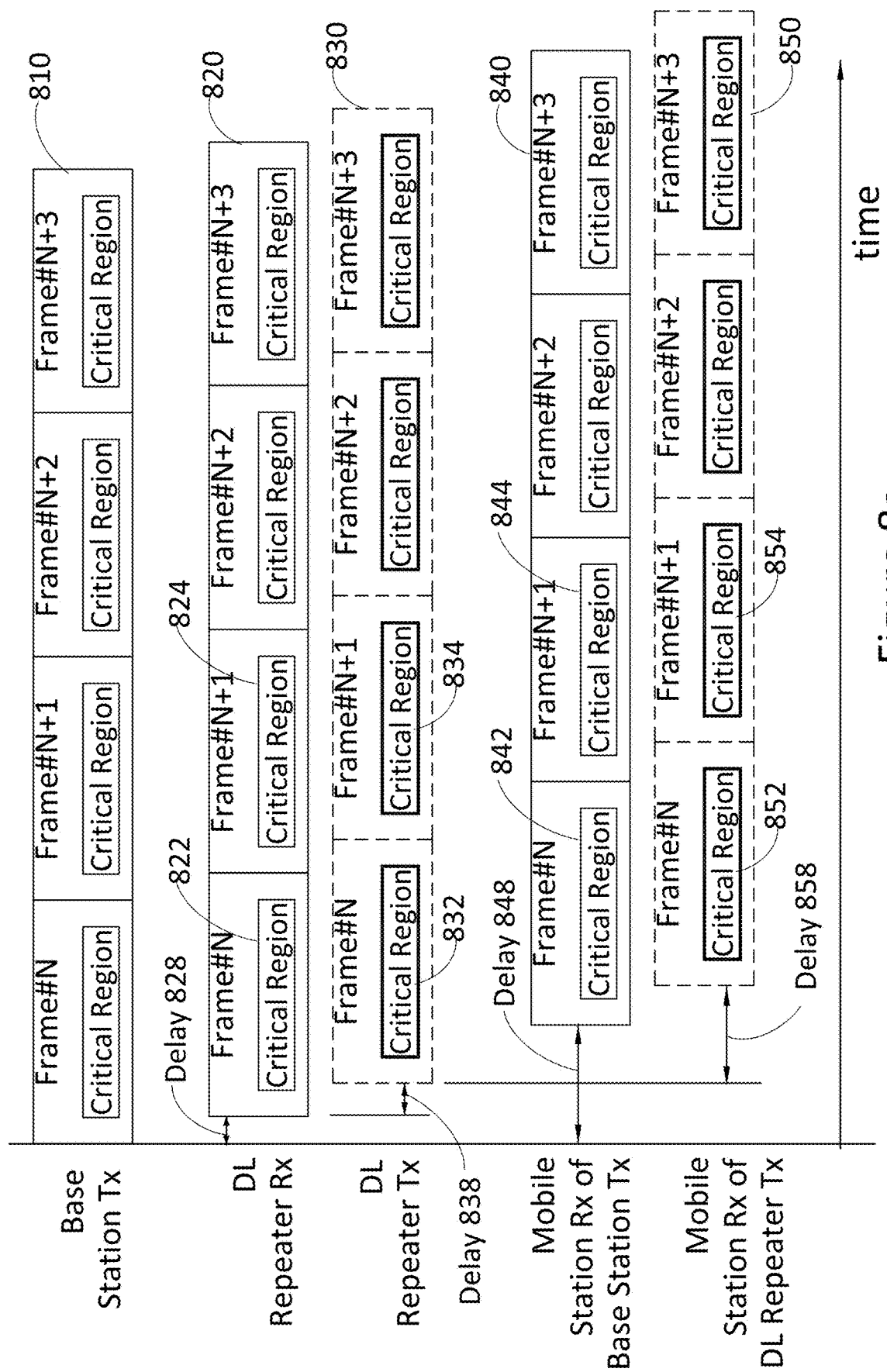
FIG. 8a is a time flow diagram of tx (transmitted) and rx (received) frames according to a first embodiment of the invention which does not involve use of a silent region.

The repeated signal 608 may be transmitted with a controlled, also termed herein "intentional", time shift (delay) so as to ensure the repeated signal 608 is received by mobile station 604 in proper synchronization with the corresponding portions of the downlink signal 602a, e.g. as shown in the last 2 lines of FIG. 8a. Typically, said proper synchronization is such so that the receiver of mobile station 604 could properly demodulate the overall signal it receives. For example, in an OFDMA scheme, the repeated signal 608 may be received by the mobile station 604 with a relative delay to the downlink signal 602a of up to the cyclic prefix duration since under these circumstances, the delay will be handled by the equalization inherent to OFDMA receivers. Further, said controlled time shift may be based on said provided geographical coverage area.

Alternatively, DL repeater 605 may compute and generate the repeated signal 608 once, and then transmit the repeated signal 608 continuously, periodically or from time to time, regardless of further receptions of downlink signal 602c. Further alternatively, DL repeater 605 may compute and generate the repeated signal 608 periodically, from time to time, based on an external event, based on an internal event, or based on user configuration. The computed and generated signal 608 is then transmitted continuously, periodically or from time to time, regardless of further receptions of downlink signal 602c, till the next event of re-computation of the repeated signal 608. In many cases, critical regions transmitted by base station 101 vary slowly, or may be fixed for a very long duration. For example, in 3G and LTE cellular systems, synchronization signals such as PSS, SSS, SCH are fixed for a specific base station, and are transmitted periodically without a change. In such cases, the method described above of transmitting the repeated signal 608 regardless of further receptions of downlink signal 602c may be used, and has the advantage of less complexity.

It is appreciated that intentional delay to allow synchronization with an upcoming cycle is typically not possible when the critical region is so dynamic that it changes with practically each frame.

The repeated signal 608 may be transmitted with a controlled frequency shift so as to make the repeated signal 608 to be received by mobile station 604 in proper frequency synchronization with the corresponding portions of the downlink signal 602a. Typically, the proper synchronization is such so that the receiver of mobile station 604 could properly demodulate the overall signal it receives. Further, said controlled frequency shift may be based on said provided geographical coverage area or on analysis of the mobile station 604 uplink signals.

Typically, DL repeater 605 is able to receive signal 602c in higher quality than mobile station 604. The higher quality may be achieved due to at least one of the following:

a. DL repeater 605 may comprise multiple antennas or an antenna array, which may enable the use of advanced antenna system techniques, such as: beam switching, Maximal Ratio Combining (MRC), beam-forming and other known in the art algorithms. Such techniques enhance the quality of the reception, and enable to mitigate multipath, interferences and low Signal to Noise (SNR) conditions. A typical mobile station 604 has a small number of reception antennas, typically one or two. Due to its small size, a typical mobile station 604 cannot accommodate more antennas. DL repeater 605 may accommodate a higher number of antennas, and may have a larger size than mobile station 604.

b. DL repeater 605 may comprise directional antennas, i.e. high gain antennas, which enhance the received signal quality in terms of SNR and interferences from other transmitters. Typically, the location of the base station 101 is known, so that the reception directional antenna or antennas of DL repeater 605 may be set to point to the direction of the base station 101, or to track its position. Typically, mobile station 604 has an omni antenna or antennas, resulting a low gain antenna and a lower quality reception.

c. Typically, the DL repeater 605 is located at a geographical position selected to provide good reception, e.g. better than the quality of reception which at least some mobile devices may need to contend with due to, say, low topographical position affecting line of sight conditions (LOS) conditions, proximity to structural communication obstacles such as obstructing walls and buildings, and so on. The favored position selected for the DL repeater may for example be a location situated at a certain height, enabling reception of line of sight conditions (LOS), and/or may be removed from any possible obstacle and/or may be nearer to other nodes e.g. the DL repeater 605's distance from the base station and DL repeater 605's distance from the mobile device are both smaller than the distance between the mobile device and the base station. Or, DL partial repeater 605's distance from the base station is smaller than the distance between the mobile device and the base station.

d. The DL partial repeater 605 may use better hardware (e.g. some or all of: LNA with lower noise figure, better down-converters, better filters) than other nodes in the communication network, thereby enhancing its own reception quality (e.g. improving the sensitivity level of its receiver), hence the reception quality of the partially repeated transmission DL partial repeater 605 sends to the mobile devices.

e. Alternatively or in addition, DL partial repeater 605 may use suitable signal processing algorithms (such as but not limited to equalization and/or interference cancellation, which improve the DL partial repeater's own reception quality, hence the reception quality of the partially repeated transmission DL partial repeater 605 sends to the mobile devices.

f. The DL partial repeater 605 may have prior knowledge of the DL signal properties of the base station. For example, DL partial repeater 605 may know specific modulation parameters of frame structure that the specific base station employs.

Typically, DL repeater 605 is operative to transmit signal 608 so as to be received by mobile station 604 with a higher quality than the original signal 602a sent by the base station 101. The higher quality may be achieved due to one, some or all of the following:

a. DL repeater 605 may comprise multiple transmit antennas or an antenna array, which may enable the use of advanced antenna system techniques, such as some or all of beam switching, beam-forming and other known in the art algorithms. Such techniques enhance the quality of the reception by the mobile station 604, and enable to mitigate multipath, interferences and low Signal to Noise (SNR) conditions.

b. DL repeater 605 may comprise directional transmit antennas, e.g. high gain antennas, which enhance the received signal quality of the mobile station 604 in terms of SNR and interferences from other transmitters. Optionally, the location of the mobile station 604 is known, so that the transmit directional antenna or antennas of DL repeater 605 may be set to point to the direction of the mobile station 604, or to track its position.

c. Typically, the DL repeater 605 is located at a geographical position selected to ensure good reception by the mobile station 604, e.g. better than the quality of reception of the base station 101. The favored position selected for the DL repeater may for example be a location situated at or over a certain height, enabling transmission of line of sight conditions (LOS), and/or may be removed from any possible obstacle and/or may be nearer to other nodes. And/or, DL partial repeater 605's distance from the mobile station may be smaller than the distance between the mobile device and the base station.

d. The DL partial repeater 605 may use better hardware (e.g. Power Amplifier with lower distortions and/or better up converters and/or better filters) than the base station 101, thereby enhancing DL partial repeater 605's reception quality by the mobile station.

e. Alternatively or in addition, DL partial repeater 605 may use suitable signal processing algorithms (such as decoding and re-encoding) that improve the reception quality of the mobile station 604.

f. The DL partial repeater 605 may transmit signal 608 with higher power than the power transmitted by the base station 101.

Typically, adequate reception of the critical region enables to better reception of the other DL signals. For example, frequency synchronization and timing synchronization done using the critical regions are applied also for the reception of the other DL signals.

Figure 11:
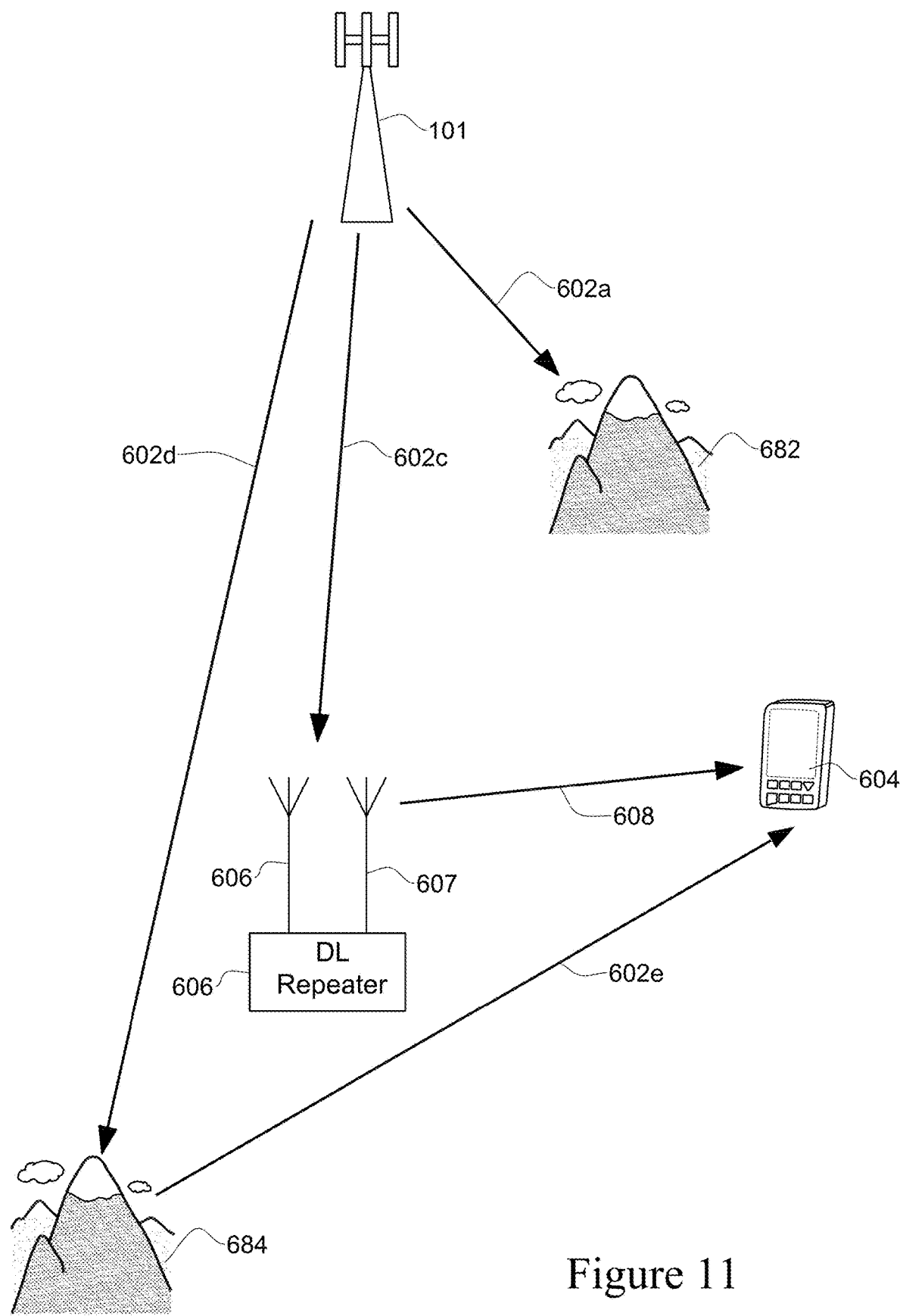
FIG. 11 is an illustration of the cellular communication system of FIG. 6, operative in a geographical environment introducing topographic obstacles, in accordance with a further embodiment of the present invention.

FIG. 11 illustrates the cellular communication system of FIG. 6, operating in a geographical environment including topographic obstacles, in accordance with further embodiments of the present invention. In this scenario, an obstacle 682 stands in the way of downlink signal 602*a* from base station 101 to mobile device 604, thus direct (line of sight) signal path 602*a* does not reach mobile device 604. However, other non-direct (non line of sight) signal paths from base station 101 to mobile device 604 may still exist, such as path 602*d* from base station 101 to a second obstacle 684, a reflection caused by obstacle 684, and the path 602*e* from obstacle 684 to mobile device 604.

This mechanism of non-line-of-sight transmissions is well known in the art and in cellular communications particularly. However, in some cases, the signal strength and/or quality of signal 602*e* is too poor for proper downlink reception of the critical regions. According to certain embodiments, a DL repeater 605 is provided which aids mobile device 604 in receiving the critical regions, as described above regarding FIG. 6.

In the scenario of FIG. 11, the mobile device 604 may receive, in superposition, downlink signals from the path 602*d*-602*e* and from the path 602*c*-608. Path 602*d*-602*e* may optionally have a larger propagation delay than path 602*c*-608. Optionally, DL repeater 605 introduces an adjustable or tunable delay in order to make the relative delay between paths 602*c*-608 and 602*d*-602*e* smaller, thus facilitating mobile device 604's synchronization and/or equalization processes. This embodiment is further described hereinbelow with reference to FIGS. 8*a-d*. Obstacles 682 and 684 may be, for example, a mountain, row of buildings, or any other physical obstacle.

Figure 9A:
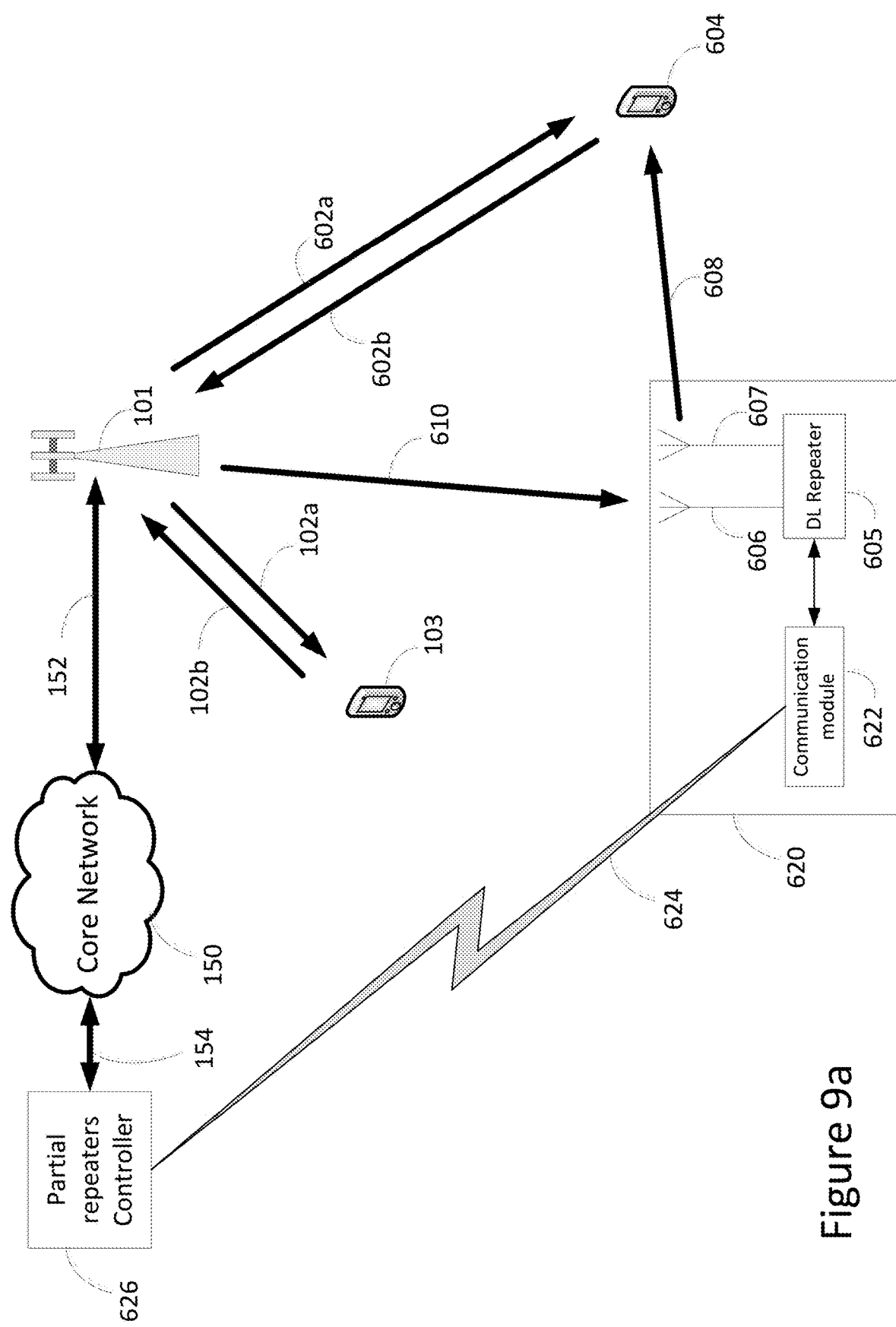
FIG. 9a-9b are semi-pictorial, semi-block diagram illustrations of a cellular communication system in accordance with respective further embodiments of the present invention.

FIG. 9*a* is a semi-pictorial, semi-block diagram illustration of a cellular communication system in accordance with a further embodiment of the present invention. The system of FIG. 9*a* may be similar to the system of FIG. 6 however it also comprises a set of at least one and typically many communication modules 622 co-located with e.g. integrally formed with at least one and typically many partial repeaters 605 respectively, and communicating with a partial repeater central controller 626 via a communication link 624 e.g. via optical fiber. Alternatively, controller 626 may be a node in the network e.g. as an application server, and its communication with communication modules 622 may be via the network, accordingly. More generally, communication modules 622 and partial repeater central controller 626 communicate through any suitable communication links e.g. cellular, WiMAX, optical fiber, microwave link or any other suitable protocol for communication links.

Typically, communication module 622 and DL repeater 605 are co-located, together constituting unit 620. Optionally, they are integrally formed.

Typically, the partial repeater controller 626 is connected to and communicates with the cellular core network 150 via a communication link 154. Communication link 154 may comprise an optical fiber, a microwave link, a wired communication link, or may be implemented by any other suitable communication link technology. Typically, a population of communication modules 622 (and hence units 620) are served by a partial repeater central controller 626. Typically, partial repeater central controller 626 knows which cell each mobile device is currently included in (i.e. which base station 101 serves each mobile device 604). This information is typically accessible to the controller 626 through the core network 150. Also optionally, controller 626 has access also to the reception quality measurements of the mobile devices 604, which are sent by the mobile devices to the base stations 101 and to the core network 150.

Typically, controller 626 controls the operation of repeater 605. The control may for example include some or all of the following:

a. Turn DL repeater transmission on or off
b. Which base station 101 to receive and repeat
c. Which critical region/s to repeat
d. At which power level to transmit
e. Beam-forming parameters (e.g. antenna weights) for receiving base station 101
f. Beam-forming parameters (e.g. antenna weights) for transmitting the repeated signal to mobile devices It is appreciated that a plurality of units 620 may be provided, each including a communication module 622 co-located with e.g. integrally formed with partial repeaters 605, of which for simplicity, only one is shown in FIG. 9*a*.

Figure 9B:
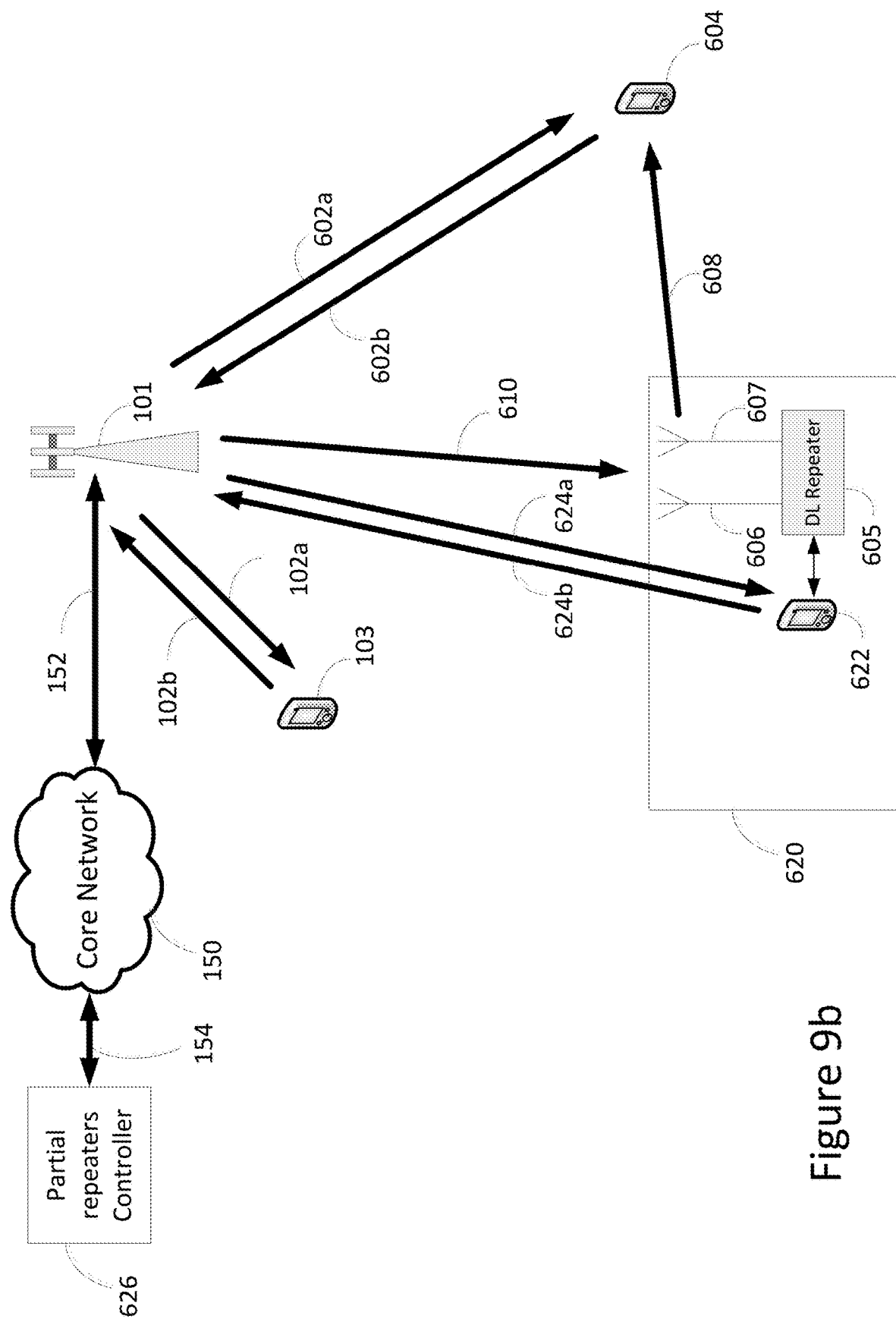

FIG. 9*b* is a semi-pictorial, semi-block diagram illustration of a cellular communication system in accordance with a further embodiment of the present invention. The system of FIG. 9*b* may be similar to the system of FIG. 9*a* however in FIG. 9*b*, communication module 622 and partial repeater central controller 626 each comprise a mobile communication device, and the communication between communication module 622 and partial repeater central controller 626 occurs over the cellular network. Alternatively, communication module 622 comprises a mobile communication device and partial repeater central controller 626 comprises an application server connected to the core such that partial repeater central controller's communication link with each unit 620 may be one of the cellular links of the network. Optionally, the mobile communication device 622 may be an external cellular mobile device connected to repeater 605 via an interface such as but not limited to UBS, infra-red, WiFi, Bluetooth. Alternatively, the mobile communication device 622 may be integrated into the repeater 605 thus may use the repeater's internal hardware resources, such as but not limited to antennas, RF circuits, modem hardware.

Figure 10A:
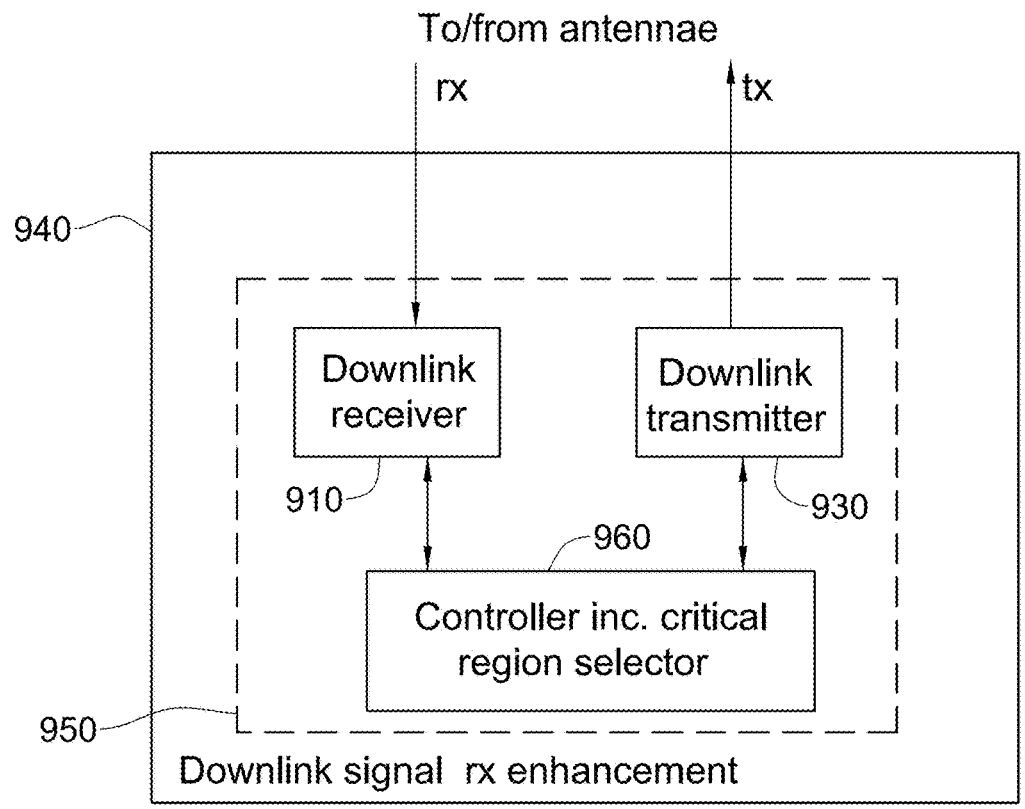
FIGS. 10a-10b are semi-pictorial, semi-block diagram illustrations of a DL (downlink) downlink signal reception enhancement system which may serve as the repeater of FIG. 6.

Reference is now made to FIG. 10*a* which is a simplified functional block diagram of a downlink signal reception enhancement system 940 constructed and operative in accordance with a first embodiment of the present invention. The system as shown is suitable, for example, for implementing the DL repeater 605 of FIG. 6 or of FIGS. 9*a*-9*b*. As shown, downlink signal reception enhancement system 940 includes partial repeater apparatus 950 which includes a downlink receiver 910 operative to receive downlink signals from a base station e.g. base station 101 of FIG. 6, via one or more antennae e.g. 606, 607 in FIG. 6. The receiver 910 is adapted to match the downlink parameters defined by the communication protocol, such as but not limited to GSM, 3G, or LTE, which typically differ from the uplink parameters defined by the same protocol e.g. different frequencies as in GSM, or different modulation coding as in 3G protocols.

The receiver 910 typically synchronizes with, demodulates and decodes at least portions of the downlink communication. The receiver 910 may for example be identical to the receivers in mobile devices e.g. elements 103, 604 in FIG. 6, served by the base station and by the downlink signal reception enhancement system. Alternatively or in addition, receiver 910 may comprise additional signal processing algorithms for improving its reception and decoding quality.

Partial repeater apparatus 950 also includes a downlink transmitter 930 which transmits (partial, as described herein) downlink signals derived from the signals received from the base station, e.g. as described herein, to mobile devices within range which are deemed in need of reception "assistance" or help, e.g. devices 103, 604 in FIG. 6, via antennae e.g. antennae 606, 607 in FIG. 6. The downlink transmitter 930 is adapted to match the downlink parameters defined by the communication protocol, which typically differ from the uplink parameters defined by the same protocol. The transmitter 950 encodes and modulates portions of the signal received by receiver 910. The transmitter 950 may for example be identical to the transmitter in base station 101 in FIG. 6. Alternatively or in addition, transmitter 950 may comprise additional signal processing algorithms for improving the reception and decoding quality by the mobile devices 604.

Partial repeater apparatus 950 also includes a controller 960 including a critical region selector whose functionality is described herein in detail with reference to FIGS. 7a-7d. Typically, controller 960 analyzes the signals received and decoded by receiver 910. Typically, controller 960 controls the operation of the receiver 910 and the transmitter 930. The control may for example include some or all of the following:
 a. Turn DL repeater transmission on or off
 b. Which base station 101 to receive and repeat
 c. which critical regions to repeat
 d. at which power level to transmit
 e. Beam-forming parameters (e.g. antenna weights) for receiving base station 101
 f. Beam-forming parameters (e.g. antenna weights) for transmitting the repeated signal to mobile devices Optionally, controller 960 comprises a storage device and stores at least portions of the decoded received signal on said storage device. The storage device may be, for example, RAM, hard disk, flash memory, or any other suitable computer storage technology.

Figure 10B:
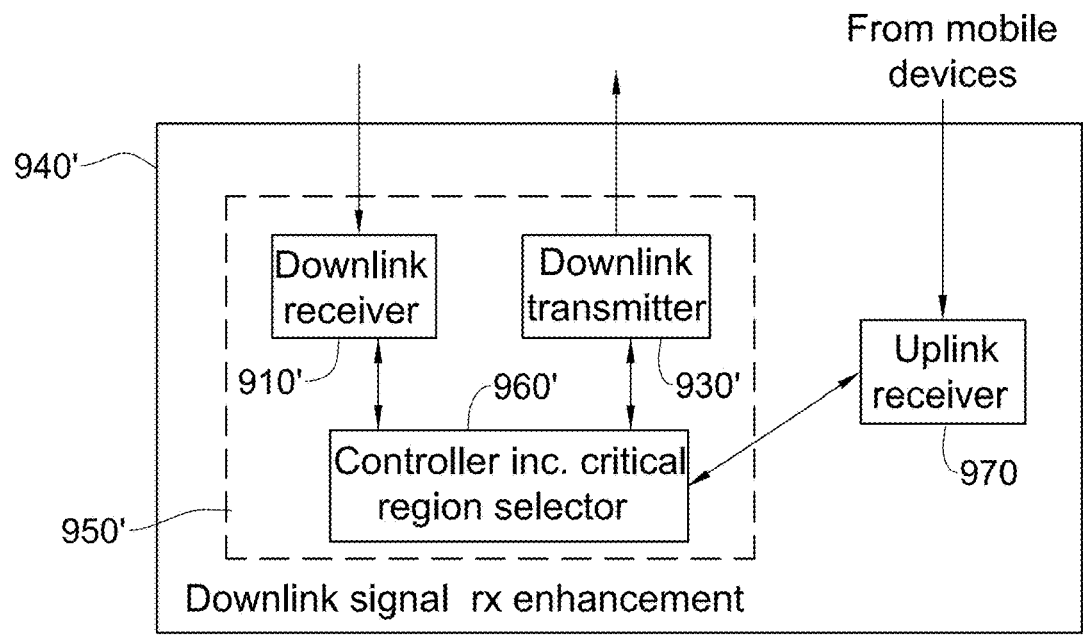

Reference is now made to FIG. 10b which is a simplified functional block diagram of a downlink signal reception enhancement system 940' constructed and operative in accordance with a second embodiment of the present invention. The system as shown is suitable, for example, for implementing the DL repeater 605 of FIG. 6. The apparatus of FIG. 10b may be similar to the apparatus of FIG. 10a and elements 910', 930', 940', 950', 960' may be respectively identical to elements 910, 930, 940, 950, 960 in FIG. 10a, except that the downlink signal reception enhancement system 940' includes an uplink receiver 970 as described below in detail which receives and processes uplinks from mobile devices and provides inputs to the controller 960 accordingly. Typically, uplink receiver 970 senses and analyzes uplink transmissions in uplink receiver 970's coverage area, thus providing controller 960 with information about mobile devices in the coverage are (such as device 604). Optionally, such information may include, for example, one or more of the following:
 a. Which mobile devices (such as device 604) are in the coverage area of system 940
 b. The reception quality of the downlink signals by a mobile device 604, as reported by the mobile device in its uplink transmission
 c. The received downlink signal level measured by a mobile device 604, as reported by the mobile device in its uplink transmission Typically, controller 960 uses the information provided by the uplink receiver 970 for controlling the operation of the receiver 910 and the transmitter 930, as described above.

FIGS. 7a-7d are respectively simplified flowchart illustrations of four alternative methods of operation for the partial repeater 605 of FIG. 6, for the embodiments shown in FIGS. 10a and 10b. It is appreciated that some or all of the operations described may be performed, in any suitable order such as but not limited to the order actually shown by way of example.

Figure 7A:
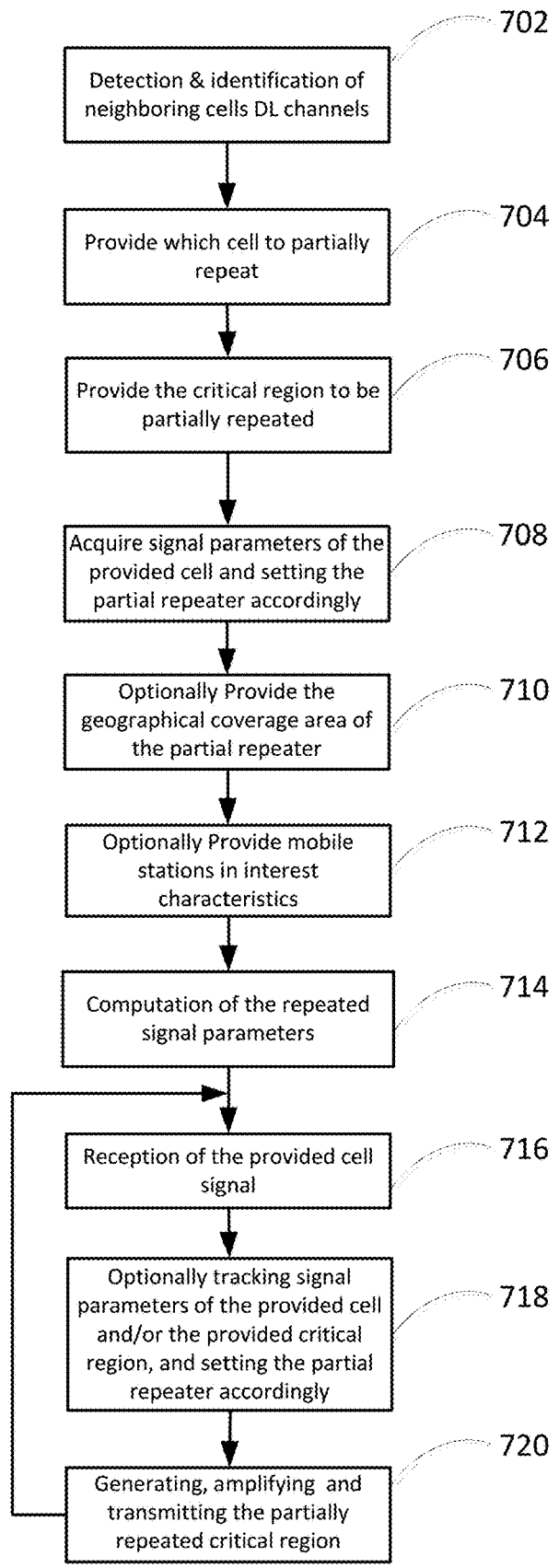
FIGS. 7a-7d are simplified flowchart illustrations of four alternative methods of operation for the partial repeater 605 of FIG. 6; more generally the methods may include some or all of the illustrated steps, suitably ordered e.g. as illustrated.
Figure 7B:
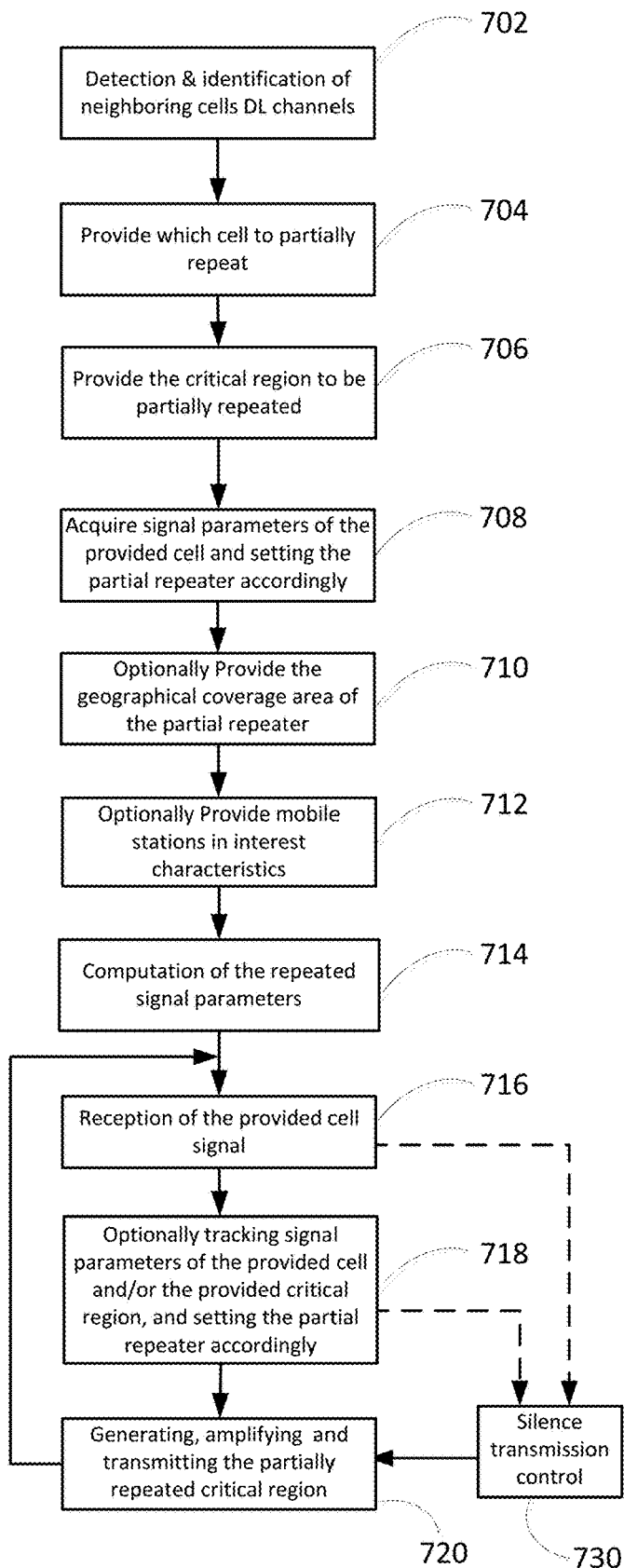
Figure 8B:
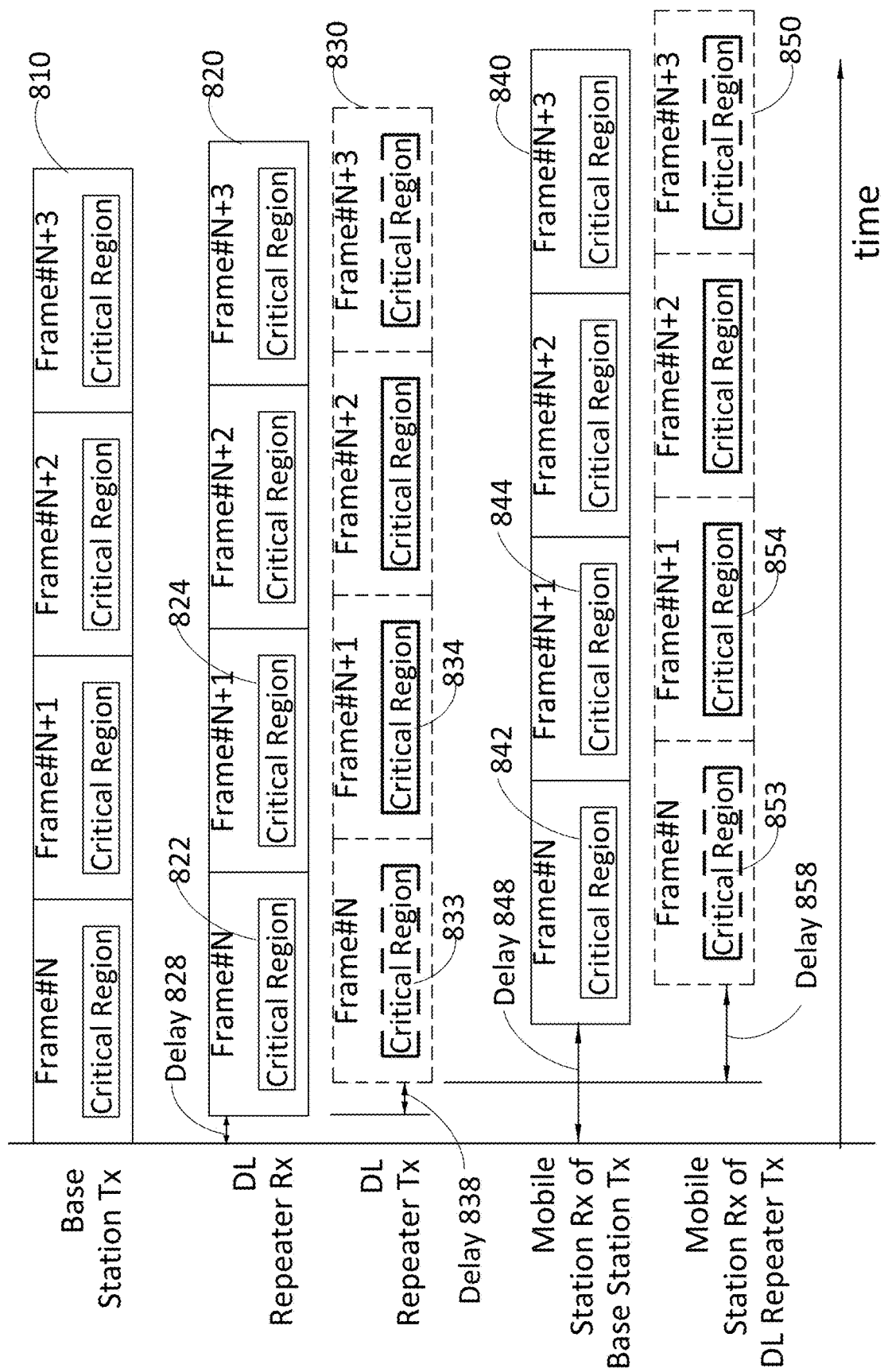
FIG. 8b is a time flow diagram of tx (transmitted) and rx (received) frames according to a second embodiment of the invention which does involve use of a silent region.

The methods of operation for the partial repeater 605 shown in FIGS. 7a, 7b respectively correspond to the time flow diagrams of FIGS. 8a-8b which are now described. Alternatively, the methods of operation for the partial repeater 605 shown in FIGS. 7a, 7b may respectively correspond to the time flow diagrams of FIGS. 8c-8d described below.

FIG. 8a is a time flow diagram of tx (transmitted) and rx (received) frames according to a first embodiment of the invention which does not involve use of a silent region. The mobile device 604 (say) receives both base station 101's and DL Repeater 605's signals in superposition. The mobile device 604's receiver may handle the superposition by using equalization techniques so as to mitigate multipath. However, this may not be necessary e.g. if the DL repeater signal is much stronger than the base station signal e.g. due to tx power, shorter distance to the mobile device, and/or beam-forming.

The method of operation for the partial repeater 605 shown in FIG. 7a, which corresponds to the time flow diagram of FIG. 8a, is now described in detail. Typically, steps 702-714 are set-up steps.

Step 702. The controller 960 shown in FIG. 10a-10b typically includes functionality for identifying at least one base station (cell) to serve its DL reception enhancement system 940. Alternatively or in addition, controller 620 may be hardwired for one or more specific base station/s.

Step 704. If a plurality of base stations are found to be suitable to serve the DL reception enhancement system 940, select one of the base stations identified in step 702 to serve the DL reception enhancement system 940. Said selection may be based on suitable criteria, such as but not limited to signal strength and/or geographical location, or may be configured manually. Optionally, the selection may be effected by controller 960 of FIG. 10a or 960' of FIG. 10b. Further optionally or in addition, the selection may be effected by controller 626 of FIG. 9a or 9b.

It is appreciated that partial repeaters can be positioned in any geographical location in which analysis of the electromagnetic coverage yields that a base station, if provided, could enhance reception.

Step 706. Select a critical region of the signal e.g. out of each frame in the signal. It is appreciated that signals are divided into frames in many conventional cellular communication protocols, where the definition of the frames depends on the protocol. Selection of the critical region may be in accordance with criteria either predetermined e.g. preconfigured or burned, or criteria which are manually set using manual settings on a suitable human operable input device and/or a subsystem may determine which region is critical, on the basis of dynamic analysis, and/or an external functionality may determine which region is critical, on the basis of dynamic analysis. The external functionality may for example be located at a remote location e.g. at the hub of the cellular network operator, and may communicate suitably, e.g. via fiber optics, with the critical region selector. Optionally, the selection is made by controller 960 of FIG. 10*a* or FIG. 10*b*. Further optionally or in addition, the selection is made by controller 626 of FIG. 9*a* or FIG. 9*b*. Optionally, a plurality of critical regions may be selected.

Step 708. The partial repeater is set in accordance with signal parameters acquired from the cell to which the apparatus of DL repeater 605 is associated. The signal parameters typically include frame parameters e.g. a base station may decide to transmit a particular frame using 16 QAM modulation or using some other QAM order characterizing the particular modulation technique being employed. Another example is identification and analysis of the type and/or parameters of synchronization and control signals such as but not limited to PDCCH in the frame.

Step 710. The partial repeater 605 may be "assigned" to a particular geographical area for which it is responsible. If so, directional transmission directed exclusively to that area or section may be preferable, as opposed to transmission to the entire 360 degree azimuth, e.g. so as to transmit with less power. Optionally, said directional transmission is controlled by applying beam-forming, using more than one Tx antenna of repeater 605. Alternatively, said directional transmission may be controlled by using directional Tx antennae which is pointed to the desired azimuth either manually or by a servo mechanism. Optionally, the directional transmission is controlled by controller 960 of FIG. 10*a* or 960' of FIG. 10*b*. Further optionally or in addition, it is controlled by controller 626 of FIG. 9*a* or FIG. 9*b*.

Step 712. Mobile devices of interest for which it is desired to enhance quality of reception, may be defined. These definitions may again be configured, or provided dynamically either from an external or an internal source. This enables a critical region suitable for an individual mobile device of interest to be selected. For example, the base station may assign particular blocks (locations along the time and/or frequency axes) within a frame to individual mobile devices e.g. as indicated by maps inside the frame as opposed to blocks intended for broadcast to all. Each mobile device may have an ID e.g. a mac-address-based ID in some protocols or TMSI or IMSI in GSM protocols. The partial repeater may then ensure that the blocks assigned to particular mobile devices are within the critical region received by those specific mobile devices from the partial repeater.

It is appreciated that transmission of the critical region may not be repeated indiscriminately. Instead, transmission of the critical region may be repeated only if the mobile device/s-to-be-helped's quality measurements as transmitted to base station indicates there is a need.

In step 714, the repeated signal's parameters are computed, e.g. the modulation technique (such as but not limited to QPSK, 16 QAM, 32 QAM), the code rate (½, ⅓, ⅚ etc.), the timing and frequency synchronization and so forth.

Typically, the repeated signal parameters correspond to the parameters in the downlink. The downlink signal's map may for example indicate that modulation to a particular mobile device has the following parameters. For example, beam-forming may be utilized when transmitting, so as to transmit to a particular section. If the partial repeater receives an indication, e.g. via fiber optics, of a new section, different beam-forming may be utilized. Transmission may be switched on and off at selected points on the time axis, and/or the downlink transmitter 930's frequency and/or bandwidth or and/filter parameters and/or intensity may be adjusted, and delay may or may not be introduced; since delays vis a vis transmissions from the base station are sometimes very small, practically speaking, delay may not be introduced.

Step 716. As described above, steps above up to and including step 714 are typically set-up or configuration steps whereas steps 716 onwards pertain to actual reception operations performed e.g. by the receiver of FIG. 10*a* or 10*b*. The steps 716-718-720 shown in FIG. 7*a* correspond to the time flow diagrams of FIG. 8*a*.

Base station 101 transmits downlink signal 810 which includes one or more critical regions. Due to propagation delay, the downlink signal is received by the downlink receiver 910 with a delay 828 along the time axis, as marked by signal 820. In step 716, the downlink receiver 910 demodulates, decodes, and analyzes the received downlink signal 820 of the selected cell (e.g. signal that is transmitted by the selected base station 101). Typically, step 716 is performed on a frame-by-frame basis. Alternatively, step 716 may be performed on several frames together. Said demodulation and decoding includes at least one critical region that was selected in the steps above.

Referring now to Step 720 which follows step 718 described below, in step 720 the critical region (or regions) is or are generated and transmitted by the downlink transmitter 930. Said generation typically includes encoding, modulating and optionally including modification thereof. Generation of the critical region typically includes regenerating at least a portion of the (typically cleaned of interference) signal which includes the critical region, optionally including modifying the signal portion e.g. by amplification and/or time-shifting/delay thereof. Next, the apparatus of FIGS. 10*a*-10*b* (e.g.) is operative for transmitting at least some of the regenerated signal, including, e.g. including only, the regenerated critical region. Modification of the critical region may include amplification thereof or beam-forming thereof to a designated section, for directional transmission, or introduction of delay therewithin. The transmitted signal of downlink transmitter 930 is referenced as signal 830 in FIG. 8*a*. Typically, step 720 is performed on a frame-by-frame basis. Alternatively, step 720 may be performed on several frames together. Said modulation and encoding includes at least one critical region that was selected in the steps above. Typically, the at least one critical region is transmitted, as noted for example by regions 832 and 834, while the other regions of the frames in signal 830 are left empty, i.e. not transmitted, as indicated by dashed lines in FIG. 8*a*.

Typically, transmitted signal 830 is transmitted by downlink transmitter 930 with a certain delay, denoted in the drawing as delay 838. Eelay 838 may for example occur due to internal processing implementation. Optionally and alternatively, the delay may be intentionally adjusted, as described below.

Due to propagation delay, the transmitted signal 830 is received by the target mobile device 604 with a delayed timing, as denoted by signal 850. Such delay is denoted herein as delay 858. Concurrently, in superposition, mobile device 604 receives signal 840 from the base station. Signal 840 is actually the base station transmitted signal 810, received by mobile device 604 with propagation delay 848.

Several embodiments are described hereinbelow regarding the delay 838 introduced by the downlink transmitter:

The system is designed such that delay is tolerable. In a first embodiment, as shown in FIG. 8a, delay 838 is such that the overall relative delay between received signal 840 and received signal 850 at the mobile device 604 is small enough so as not to introduce interference to the receiver of mobile device 604. For example, in the case of OFMD or OFDMA modulation technique (as in WiFi, WiMAX and LTE systems), a relative delay of less than the Cyclic Prefix (CP) between signals 840 and 850 is handled inherently by the OFDM equalization mechanisms. Similarly, in the case of CDMA modulation technique (as in cellular 3G systems), a small relative delay between signals 840 and 850 is handled by the RAKE receiver of mobile device 604. Thus, as long as said relative delay does not exceed some threshold tolerable amount there is no interference to the receiver of 604, or the interference is mitigated by the receiver of 604. The threshold amount typically depends on the modulation technique and the implementation of the receiver in mobile device 604.

In the event that the relative delay exceeds the tolerable threshold amount, proper reception by mobile device 604 may still be achieved if the received signal strength from the DL repeater 605 is much higher than the received signal strength from the base station 101 such that interference is negligible.

In the event that the relative delay exceeds the threshold tolerable amount but the received signal strength from the DL repeater 605 is not sufficiently high, relative to the received signal strength from base station 101, to ensure negligible interference, adequate reception by mobile device 604 may still be achieved with some degradation in quality (e.g. higher Bit Error Rate).

The relative delay may be positive or negative, i.e. received signal 840 may be early or late relative to received signal 850 at the mobile device 604.

In a second embodiment, delay 838 in FIG. 8a is deliberately introduced and controlled by controller 960 of the DL repeater 605, so as to compromise between minimizing relative delay (thus minimizing interference at the mobile device 604) and minimizing complexity of the DL repeater 605. On one hand, it is desired to minimize relative delay by causing the mobile device 604 to receive the repeated signal with minimal (ideally no) delay, relative to the original downlink signal from base-station, thereby to minimize interference to the receiver of mobile device 604. On the other hand, achieving such minimal delay may increase the complexity of the repeater 605, for example if hardware running at a faster clock is employed, or if more and/or higher-complexity processing and computations are performed. Typically, the controller applies a compromise between the above, and adjusts the relative delay to introduce a quantity or level of interference predetermined to be tolerable, so as to ensure that the complexity of the hardware and/or of the computational algorithm is not excessive. The lesser quality of the downlink receiver 910 may cause an acceptable level of inaccuracy in the transmitted (repeated) signal of DL repeater 605. For example, hardware running at a faster clock may be employed as described above, or, for more complex hardware, parallel processing functionality may be provided e.g. by using multi-core CPU's or FPGA's.

Delay is considered tolerable, e.g. as described above, if it introduces only a tolerable level of interference to the receiver of the mobile device.

In a third embodiment, delay 838 in FIG. 8a is deliberately introduced and controlled by controller 960 of the DL repeater 605, so as to compromise between relative delays of several mobile devices 604's so as to be "fair", according to a subjective definition of fairness selected by an implementor, to all devices, according to a suitable criterion of fairness such as those described below. When more than one mobile device exist and are served by the dl repeater, the subjective definition of fairness implies an algorithm for determining how the dl repeater transmitter delay should be implemented. For example, example 1 below is a "worst case" algorithm whose "fairness" is expressed in that each of the mobile devices receives the dl signal within a tolerable delay. The drawback of this algorithm is that a single mobile device with a long relative delay may impose high complexity on the dl repeater. The algorithm of example 2 does not promise that each of the mobile devices will be appropriately covered, but its "fairness" is expressed in that it tries to compromise between the needs of all mobile devices, as well as downlink repeater complexity.

Typically, the DL repeater 605 serves several mobile devices like device 604, each of which having its own relative delay between its received signals 840 and 850 due to different propagation delays. Controller 960 adjusts the intentional delay 838 so as to compromise between the various relative delays, and so as to compromise between the interferences to the various mobile devices receivers.

For example, given n mobile devices, the controller may adjust the intentional delay so that the resulting relative delay of each mobile device i is di, i=1, 2, ... n where di is the relative delay between reception of base station DL (DOWNLINK) signal and the reception of the repeated signal, by mobile device i. Example implementations include:

Example 1: the controller adjusts the intentional delay to minimize maximum(abs(di)).

Example 2: the controller adjusts the intentional delay to minimize a central tendency of {di}, such as the average, mode or median (di) value over i=1, 2, ... n.

Example 3: the controls adjusts the intentional delay to minimize the weighted average of di, where the weights are according to the priority (importance) of the mobile device.

Figure 8C:
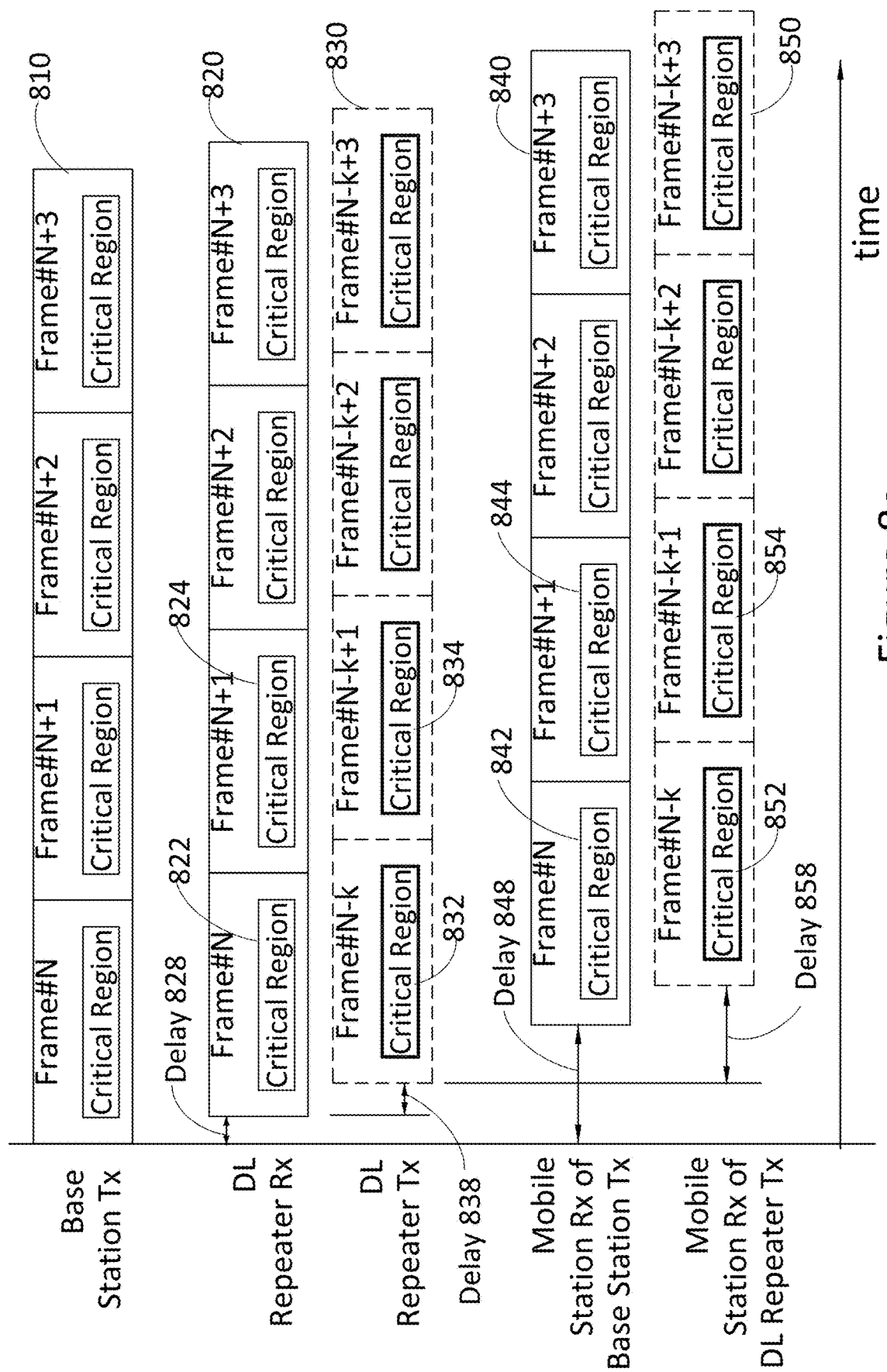
FIG. 8c is a time flow diagram of tx (transmitted) and rx (received) frames according to a third embodiment of the invention which does not involve use of a silent region.

In a fourth embodiment, illustrated in FIG. 8c, delay 838 is deliberately introduced and controlled by controller 960 of the DL (downlink) repeater 605 so as to achieve synchronization between signals 840 and 850 at the receiver of mobile device 604, such that the relative delay between signals 840 and 850 is brought practically to zero (less than an engineering magnitude of the tolerable delay as defined above). In this embodiment, the value noted "k" in FIG. 8c is zero, i.e. k=0. This embodiment may be suitable for example, for the scenario illustrated in FIG. 11. In reference to FIG. 11, the line-of-sight path 602a is blocked by obstacle 682, hence mobile device 604 receives a downlink signal from base station 101 via non-line-of-sight path 602d-602e and also from DL (downlink) repeater 605 via path 602c-608. In a scenario in which the propagation delay of path 602d-602e exceeds that of 602c-608, controller 960 may introduce a delay 838 that matches (or equalizes) the delay, resulting in zero or negligible relative delay.

In a fifth embodiment, illustrated in FIG. 8c, delay 838 is deliberately introduced and controlled by controller 960 of the DL (downlink) repeater 605, aiming at synchronizing between signals 840 and 850 at the receiver of mobile device 604. In this embodiment, the value noted "k" in FIG. 8c is a positive integer, i.e. k>0. This embodiment is applicable e.g. to a scenario in which a critical region (or regions) is periodically transmitted in the downlink signal from the base station, or at least varies slowly (e.g. once every 100 frames, once per hour, or once per day). In such a scenario, the DL (downlink) repeater 605 may optionally implement some or all of the following operations, suitably ordered e.g. as shown:

a. Downlink receiver 910 receives signal 820, demodulates, decodes and analyzes critical region 822 of frame#N.

b. Controller 960 stores information about critical region 822 of frame#N (e.g. in memory or hard disk or flash). Typically, the stored information includes all information to be used for regenerating a signal including critical region 822.

c. Controller 960 adjusts delay 838 and parameter k so as to synchronize signals 840 and 850 to a frame boundary.

d. Downlink transmitter 930 transmits signal 830 by transmitting critical region 832 of historical stored frame#(N−k), and also introducing delay 838 in transmission. The remainder of transmitted frame#(N−k), except from the critical regionI, if left blank.

The mobile station 604 now receives signal 840 from its base station, and signal 850 from DL (downlink) repeater 605, in superposition, and in timing synchronization or at least at a timing which practically speaking is close enough (i.e. less than an engineering magnitude of the tolerable delay as defined above) to synchronization. When a mobile device ostensibly receives frame#N from base station, the mobile device actually receives the critical region of frame#N from signal 840 in superposition with the critical region of frame#(N−k) from signal 850. Since the critical region signal varies slowly, or may even be a periodically fixed signal in some cases, no interference is introduced to the mobile device receiver 604, for most or all of the time.

Optionally or in addition, in all of the embodiments described above, the controlled delay 838 may be computed by controller 960 based on one or more of the following:

a. Measurements or information from base station 101, transmitted in the downlink signal 602c, as received by the downlink receiver 910.

b. Measurements or information from one or more mobile station(s) 604 as received by uplink receiver 970 e.g. as described herein with reference to FIG. 10b.

c. Measurements or information from the partial repeater controller 626 of FIG. 9a or FIG. 9b.

Alternatively, controlled delay 838 may be computed by controller 960 based on any other suitable measurements or other available data or using any suitable formula for delay computation e.g.

maximum, average, or median as described above.

In Step 718 of FIG. 7a, steps 702-714 are optionally repeated, periodically or on occasion, as per a suitable repetition criterion e.g. repetition once per day and/or repetition responsive to an external event such as a command from a cellular communication network central command. Step 718 allows the tracking and update of the base station to repeat the downlink signal parameters, the critical regions selection, the geographical coverage area etc.

Figure 8D:
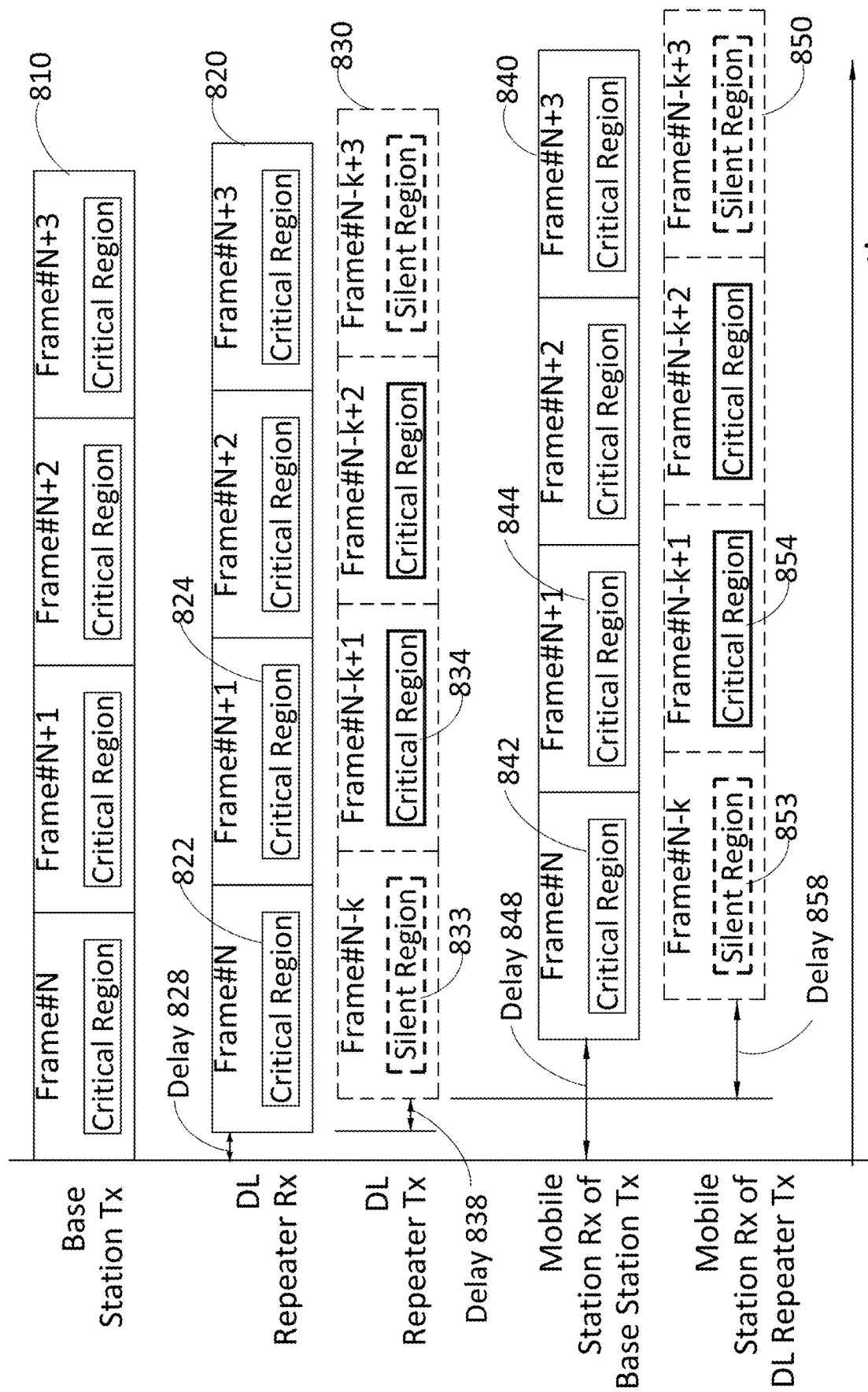
FIG. 8d is a time flow diagram of tx (transmitted) and rx (received) frames according to a fourth embodiment of the invention which does involve use of a silent region.

FIGS. 8b and 8d are time flow diagrams of tx and rx frames according to another embodiment of the invention which does involve use of a silent region. FIGS. 8b and 8d correspond to the method of FIG. 7b The description below is directed to FIG. 8b but also applies, mutatis mutandis, to the embodiment of FIG. 8d, in that FIG. 8b illustrates time delays as described above regarding FIG. 8a, whereas FIG. 8d illustrates time delays as described above regarding FIG. 8c.

In the embodiment of FIG. 8b, critical regions are only sometimes transmitted by downlink transmitter 930 (e.g. are transmitted in some frames but not in others). For example, in FIG. 8b, received critical region 824 is transmitted by transmitter 930 as critical region 834, whereas received critical region 822 is not transmitted by transmitter 930. Instead, transmitter 930 transmits a "silent region" 833.

Certain advantages of providing a "silent region" are appreciated by considering the case in which no "silent region" is provided. Absent "silent regions", as in FIG. 8a, the transmission of critical region 832 of the DL (downlink) partial repeater's downlink transmitter 930 is received by the DL (downlink) partial repeater's downlink receiver 910 (i.e. a feedback) and interfere with the reception of the downlink transmitted by the base station (critical region 822). If the critical region information or structure is dynamic rather than changing only slowly, conventional interference cancellation techniques are used to handle this interference.

Use of the "silent region" as shown in FIG. 8b enables the downlink receiver 910 of DL (downlink) repeater 605 to receive the base station downlink signal's critical region 822 at least sometimes, e.g. in at least some frames, without interference from the DL (downlink) repeater's Tx signal, because a silent region 833 is transmitted instead of the critical region 832 of FIG. 8a. Hence, there is no feedback and no special interference cancellation techniques need be employed. A silent region may be allocated once, or periodically, or once per a random number of frames, or according to any other suitable allocation criterion.

If the critical region changes relatively slowly from frame to frame, e.g. only every few frames, such as every 4-10 frames; or even less frequently, such as every day or few days; then the "silent region" embodiment may be used. In this embodiment, the critical region is sometimes transmitted, e.g. in some frames, and sometimes not, e.g. in other frames. In "non-silent" frames, the incoming information received by downlink receiver 910 which suffers from interference may even be disregarded by the controller 960. In the frame succeeding the "silent" frame, the critical region as received by the downlink receiver 910 in the previous "silent" frame, in which transmission silence was maintained, may be transmitted by the downlink transmitter 930, relying on the slow change characteristic of the critical region.

The method of operation for the partial repeater 605 shown in FIG. 7b, which corresponds to the time flow diagram of FIG. 8b, is typically similar to the method of operation for the partial repeater 605 shown in FIG. 7a, except for silence transmission control step 730 which controls transmission of the critical region vs. use of the silent region, in accordance with the silent region allocation criterion which may be predetermined, or dynamically determined either externally or internally.

Figure 7C:
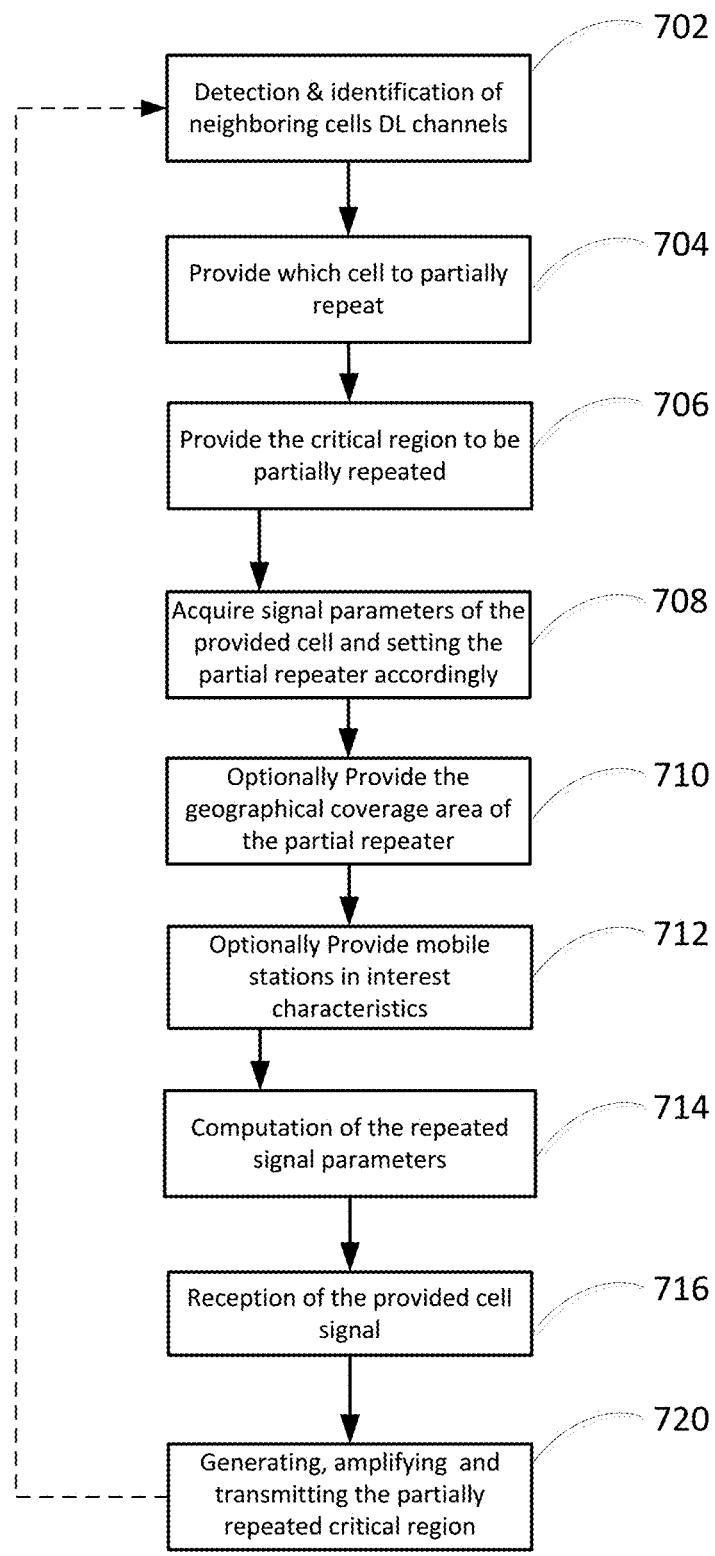

Reference is now made to FIG. 7c. In some scenarios, the critical region location within the frame and its carried information is semi-static, i.e. Remains unchanged for relatively long periods of time in the sense that the critical region location within the frame and its carried information is unchanged, frame after frame. for a period of time that is relatively long, depending on the application and the communication standard. For example, the period of time may be as short as 0.1 sec and may be as long as several hours. In such cases, the method of FIG. 7c may be used instead of FIG. 7a. Steps 702 to 716 are performed similarly as in FIG. 7a. Then, in step 720 the repeated critical region signal is generated, and periodically transmitted, typically, over and over again, according to the periodical characteristics of the semi-static critical region (for example once per frame or once per several frames. The 716-718-720 loop of FIG. 7a need not be performed. Nevertheless, upon a command from the controller 960 or from external controller, or once in a while (e.g. once a day or a week) the process may optionally return to step 702 in order to update the process parameters.

Optionally, controller 960 includes a computerized storage device which stores the generated critical region signal. Then, controller 960 periodically transmits the stored signal via the downlink transmitter 930. The use of a storage device eliminates the need to regenerate the same transmitted signal over and over, thus saving processing power and/or electrical power. The storage device may for example comprise a RAM, hard disk, flash memory, and so on. Alternatively, the transmitted critical region signal may be re-generated anew each time.

Figure 7D:
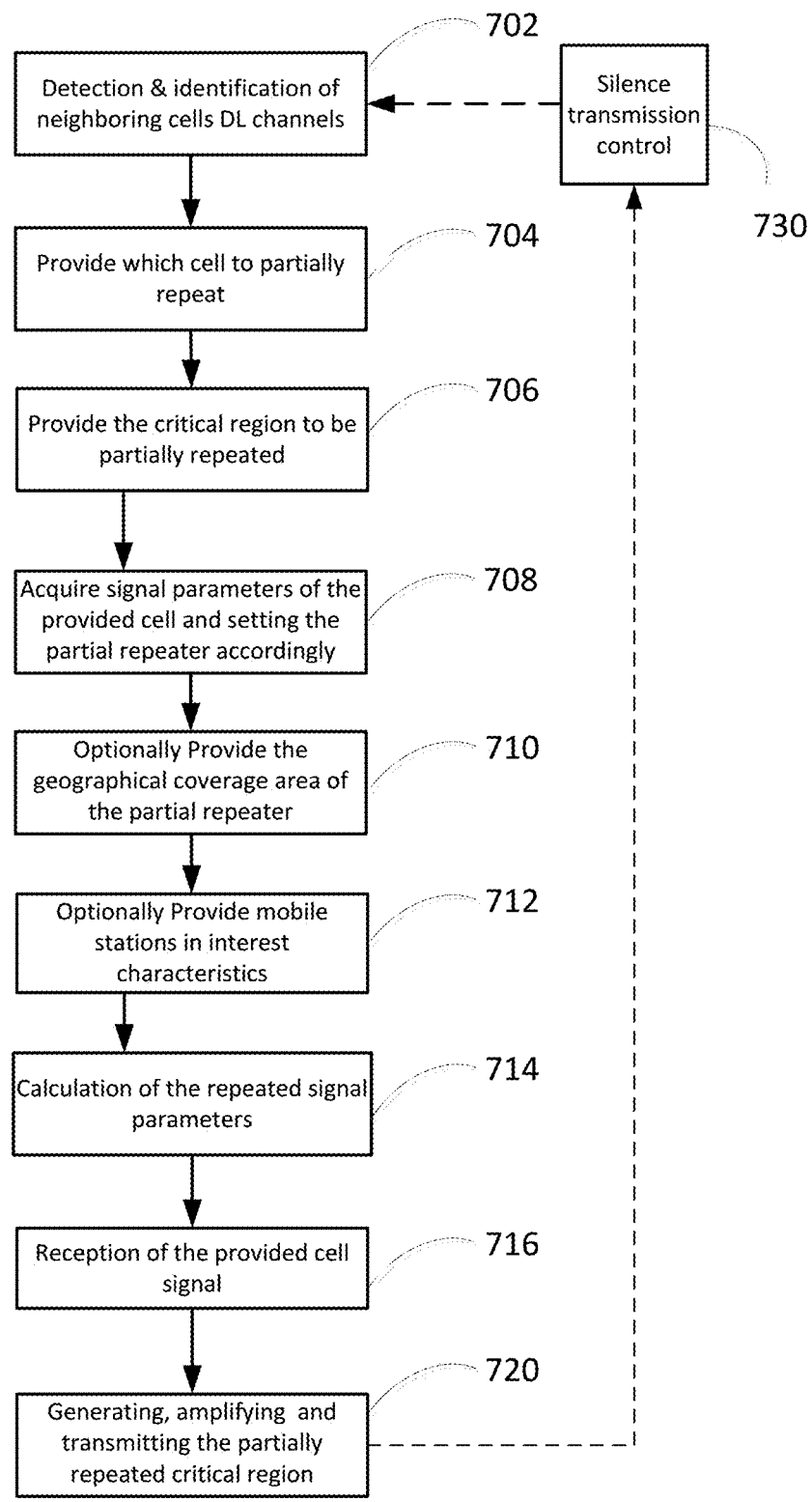

The embodiment of FIG. 7d is similar to FIG. 7c except that it employs the method of "silent region" as in FIG. 7b.

Still with reference to FIGS. 7a-8d, it is appreciated that time (delay) is only one possible parameter that the downlink repeater may adapt. Alternatively or in addition, the downlink repeater may adapt one or more other parameters of its transmission to suit mobile stations, such as but not limited to frequency, and amplitude or power, of the transmission.

It is appreciated that terminology such as "mandatory", "required", "need" and "must" refer to implementation choices made within the context of a particular implementation or application described herewithin for clarity and are not intended to be limiting since in an alternative implantation, the same elements might be defined as not mandatory and not required or might even be eliminated altogether.

It is appreciated that software components of the present invention including programs and data may, if desired, be implemented in ROM (read only memory) form including CD-ROMs, EPROMs and EEPROMs, or may be stored in any other suitable typically non-transitory computer-readable medium such as but not limited to disks of various kinds, cards of various kinds and RAMs. Components described herein as software may, alternatively, be implemented wholly or partly in hardware, if desired, using conventional techniques. Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution may include at least one of a decision, an action, a product, a service or any other information described herein that impacts, in a positive manner, a problem or objectives described herein; and (b) outputting the solution.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Features of the present invention which are described in the context of separate embodiments may also be provided in combination in a single embodiment.

For example, a system embodiment is intended to include a corresponding process embodiment. Also, each system embodiment is intended to include a server-centered "view" or client centered "view", or "view" from any other node of the system, of the entire functionality of the system, computer-readable medium, apparatus, including only those functionalities performed at that server or client or node.

Conversely, features of the invention, including method steps, which are described for brevity in the context of a single embodiment or in a certain order may be provided separately or in any suitable subcombination or in a different order. "e.g." is used herein in the sense of a specific example which is not intended to be limiting. Devices, apparatus or systems shown coupled in any of the drawings may in fact be integrated into a single platform in certain embodiments or may be coupled via any appropriate wired or wireless coupling such as but not limited to optical fiber, Ethernet, Wireless LAN, HomePNA, power line communication, cell phone, PDA, Blackberry GPRS, Satellite including GPS, or other mobile delivery. It is appreciated that in the description and drawings shown and described herein, functionalities described or illustrated as systems and sub-units thereof can also be provided as methods and steps therewithin, and functionalities described or illustrated as methods and steps therewithin can also be provided as systems and sub-units thereof. The scale used to illustrate various elements in the drawings is merely exemplary and/or appropriate for clarity of presentation and is not intended to be limiting.

The invention claimed is:

1. A downlink signal reception enhancement system for use with a cellular communication network having a base station transmitting downlink signals which are received by at least one mobile device, the downlink signal reception enhancement system comprising:
   a partial repeater apparatus operative to enhance quality of reception of at least a portion of at least one downlink signal by at least one mobile device, the partial repeater apparatus including:
      a downlink receiver receiving at least a portion of at least one downlink signal arriving from the base station;
      a controller including a critical region selector, operative to select only a portion of at least one individual downlink signal; and
      a partial transmitter operative to generate at least one signal by regenerating, according to at least one characteristic of at least one of a downlink signal and the mobile device, at least the portion selected by the critical region selector, and to transmit a signal including at least said regenerated portion and including less than all of the individual downlink signal,
   the system also comprising an uplink receiver which senses and analyzes uplink transmissions in said uplink receiver's coverage area, including providing said controller with information about mobile devices in the coverage area, and wherein said information includes at least one of the following:
      a. reception quality of the downlink signals by at least one mobile device, as reported by the mobile device in its uplink transmission; and
      b. received downlink signal level measured by the mobile device, as reported by the mobile device in its uplink transmission,
   and wherein said controller uses said information provided by the uplink receiver regarding reception quality and/or received downlink signal level, to provide at least one control signal for controlling the operation of said receiver and said transmitter, said control signal including an indication of which critical regions to repeat.

2. A system according to claim 1 wherein said regenerating includes modifying at least one characteristic of the downlink signal as received by the receiver.

3. A system according to claim 2 wherein said modifying includes amplifying the downlink signal as received by the receiver in at least one direction.

4. A system according to claim 2 wherein said modifying includes beam-forming for directional transmission and wherein said signal including at least said regenerated portion and including less than all of the individual downlink signal is transmitted in less than all possible azimuthal directions.

5. A system according to claim 2 wherein said modifying includes time-shifting of the downlink signal as received by the receiver in at least one direction, thereby to introduce an intentional delay.

6. A system according to claim 5 wherein said modifying also includes computing said intentional delay such that signals arriving at a mobile device from the partial transmitter temporally coincide with signals arriving at a mobile device from the base station.

7. A system according to claim 1 wherein each said signal comprises a frame.

8. A system according to claim 1 wherein said partial repeater apparatus is operative to receive a downlink signal from the base station at a higher reception quality than at least one mobile station served by the base station.

9. A system according to claim 8 wherein said partial repeater apparatus serves at least one mobile device whose geographical location results in interference hampering its reception and wherein said downlink receiver is disposed in a superior geographical location characterized by less interference capable of hampering its reception.

10. A system according to claim 1 wherein said partial repeater apparatus also comprises at least one antenna operative to receive from the base station and to transmit to the at least one mobile device.

11. A system according to claim 1 wherein said portion selected by the critical region selector includes a broadcast portion of a frame and does not include at least one portion of the frame which is not broadcast and instead is transmitted to only a subset of a set of mobile devices within range of the base station.

12. A system according to claim 1 wherein said portion selected by the critical region selector includes a primary synchronization signal and does not include at least one portion of the signal other than the primary synchronization signal.

13. A system according to claim 1 wherein the downlink receiver is operative for receiving at least a portion of first and second signal frames arriving from the base station and wherein said partial transmitter is operative to transmit a signal which (a) includes at least a regenerated portion of the first frame (b) includes less than all of the first frame, and (c) does not include a regenerated portion of the second frame.

14. A system according to claim 7 wherein said frame has a time axis and a frequency axis and wherein said portion selected by the critical region selector includes only a portion of the frame along the time axis.

15. A system according to claim 7 wherein said frame has a time axis and a frequency axis and wherein said portion selected by the critical region selector includes only a portion of the frame along the frequency axis.

16. A system according to claim 7 wherein said frame includes signal content addressed to a mobile station known to be suffering from poor reception and wherein said portion selected by the critical region selector includes said signal content.

17. A system according to claim 14 wherein said frame has a time axis and a frequency axis and wherein said portion selected by the critical region selector includes only a portion of the frame along the frequency axis.

18. A downlink signal reception enhancement method for use with a cellular communication network having a base station transmitting downlink signals which are received by at least one mobile device, the downlink signal reception enhancement method comprising:
   employing a partial repeater apparatus to enhance quality of reception of at least a portion of at least one downlink signal by at least one mobile device, including providing (a) a downlink receiver receiving at least a portion of at least one downlink signal arriving from the base station and (b) a controller including a critical region selector, operative to select only a portion of at least one individual downlink signal;

employing a partial transmitter operative to generate at least one signal by regenerating, according to at least one characteristic of at least one of a downlink signal and the mobile device, at least the portion selected by the critical region selector, and to transmit a signal including at least said regenerated portion and including less than all of the individual downlink signal; and a partial transmitter operative to generate at least one signal by regenerating, according to at least one characteristic of at least one of a downlink signal and the mobile device, at least the portion selected by the critical region selector, and to transmit a signal including at least said regenerated portion and including less than all of the individual downlink signal, the method also comprising an providing uplink receiver which senses and analyzes uplink transmissions in said uplink receiver's coverage area, including providing said controller with information about mobile devices in the coverage area, and wherein said information includes at least one of the following:

a. reception quality of the downlink signals by at least one mobile device, as reported by the mobile device in its uplink transmission; and b. received downlink signal level measured by the mobile device, as reported by the mobile device in its uplink transmission, and wherein said controller uses said information provided by the uplink receiver regarding reception quality and/or received downlink signal level, to provide at least one control signal for controlling the operation of said receiver and said transmitter, said control signal including an indication of which critical regions to repeat.

19. A computer program product, comprising a non-transitory computer usable medium having a computer readable program code embodied therein, said computer readable program code adapted to be executed to implement a downlink signal reception enhancement method for use with a cellular communication network having a base station transmitting downlink signals which are received by at least one mobile device, the downlink signal reception enhancement method including:

employing a partial repeater apparatus to enhance quality of reception of at least a portion of at least one downlink signal by at least one mobile device, including providing (a) a downlink receiver receiving at least a portion of at least one downlink signal arriving from the base station and (b) a controller including a critical region provider, operative to select only a portion of at least one individual downlink signal;

employing a partial transmitter operative to generate at least one signal by regenerating, according to at least one characteristic of at least one of a downlink signal and the mobile device, at least the portion selected by the critical region provider, and to transmit a signal including at least said regenerated portion and including less than all of the individual downlink signal;

the method also comprising an providing uplink receiver which senses and analyzes uplink transmissions in said uplink receiver's coverage area, including providing said controller with information about mobile devices in the coverage area, and wherein said information includes at least one of the following:

a. reception quality of the downlink signals by at least one mobile device, as reported by the mobile device in its uplink transmission; and b. received downlink signal level measured by the mobile device, as reported by the mobile device in its uplink transmission, and wherein said controller uses said information provided by the uplink receiver regarding reception quality and/or received downlink signal level, to provide at least one control signal for controlling the operation of said receiver and said transmitter, said control signal including an indication of which critical regions to repeat.

* * * * *